(12) United States Patent
Rongley

(10) Patent No.: US 11,308,444 B2
(45) Date of Patent: Apr. 19, 2022

(54) SYSTEMS, METHODS, COMPUTING PLATFORMS, AND STORAGE MEDIA FOR DIRECTING AND CONTROLLING A SUPPLY CHAIN CONTROL TERRITORY IN AN AUTONOMOUS INVENTORY MANAGEMENT SYSTEM

(71) Applicant: Autonomous Shelf, Inc., Denver, CO (US)

(72) Inventor: Eric Rongley, Golden, CO (US)

(73) Assignee: Autonomous Shelf, Inc., Denver, CO (US)

( * ) Notice: Subject to any disclaimer, the term of this patent is extended or adjusted under 35 U.S.C. 154(b) by 0 days.

(21) Appl. No.: 16/867,711

(22) Filed: May 6, 2020

(65) Prior Publication Data

US 2020/0364653 A1 Nov. 19, 2020

Related U.S. Application Data

(60) Provisional application No. 62/844,248, filed on May 7, 2019, provisional application No. 62/844,243, filed on May 7, 2019.

(51) Int. Cl.
*G06Q 10/08* (2012.01)
*H04L 9/32* (2006.01)
(Continued)

(52) U.S. Cl.
CPC ......... *G06Q 10/087* (2013.01); *B65D 88/74* (2013.01); *G01C 21/3415* (2013.01);
(Continued)

(58) Field of Classification Search
CPC ............... G06Q 10/087; G06Q 10/047; G06Q 10/0832; G06Q 10/0833; G06Q 50/30;
(Continued)

(56) References Cited

U.S. PATENT DOCUMENTS 6,748,292 B2   6/2004 Mountz
6,950,722 B2   9/2005 Mountz
(Continued)

FOREIGN PATENT DOCUMENTS

CA      2936393 A1   1/2017
CN   203020893 U    6/2013
(Continued)

OTHER PUBLICATIONS

Alok Raj, Analyzing critical success factors for implementation of drones in the logistics sector using grey-DEMATEL based approach, 2019 (Year: 2019).*

(Continued)

*Primary Examiner* — Florian M Zeender
*Assistant Examiner* — Nicole Elena Bruner
(74) *Attorney, Agent, or Firm* — Neugeboren O'Dowd PC

(57) ABSTRACT

Systems, methods, computing platforms, and storage media for directing and controlling an autonomous storage unit in an autonomous inventory management system are disclosed. Exemplary implementations may negotiate, by a first controller, a dispatch routine for the storage unit with a transport controller and a second controller, assign a token to the storage unit and the second controller, the token providing an identification signal between the storage unit and the second controller, register a departure event with the first controller, provide a secure connection between the storage unit and the second controller, exchange the token between the storage unit and the second controller, authenticate the secure connection based on exchanging the token, and give the storage unit permission to access a control territory assigned to the second controller.

17 Claims, 10 Drawing Sheets

(51) Int. Cl.
  *B65D 88/74* (2006.01)
  *G01C 21/34* (2006.01)
  *G05D 1/00* (2006.01)
  *G06K 7/10* (2006.01)
  *G06Q 10/04* (2012.01)
  *G06Q 50/30* (2012.01)
  *G06Q 30/00* (2012.01)

(52) U.S. Cl.
  CPC ....... *G05D 1/0088* (2013.01); *G06K 7/10366* (2013.01); *G06Q 10/047* (2013.01); *G06Q 10/0832* (2013.01); *G06Q 10/0833* (2013.01); *G06Q 50/30* (2013.01); *H04L 9/3213* (2013.01); *G01C 21/3423* (2013.01); *G05D 2201/0213* (2013.01); *G06Q 30/0185* (2013.01)

(58) Field of Classification Search
  CPC ................ G06Q 30/0815; B65D 88/74; G01C 21/3415; G01C 21/3423; G05D 1/0088; G05D 2201/0213; G06K 7/10366; H04L 9/3213
  USPC .......................................................... 705/28
  See application file for complete search history.

(56) References Cited

U.S. PATENT DOCUMENTS

| | | | |
|---|---|---|---|
| 7,243,001 B2 | 7/2007 | Janert et al. | |
| 7,402,018 B2 | 7/2008 | Mountz et al. | |
| 7,850,413 B2 | 12/2010 | Fontana | |
| 7,881,820 B2 | 2/2011 | Antony et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,086,344 B1 | 12/2011 | Mishra et al. | |
| 8,103,377 B1 | 1/2012 | Wong et al. | |
| 8,220,710 B2 | 7/2012 | Hoffman et al. | |
| 8,234,006 B1 | 7/2012 | Sachar et al. | |
| 8,239,291 B2 | 8/2012 | Hoffman et al. | |
| 8,265,873 B2 | 9/2012 | D'Andrea et al. | |
| 8,280,547 B2 | 10/2012 | D'Andrea et al. | |
| 8,306,650 B1 | 11/2012 | Antony et al. | |
| 8,326,452 B2 | 12/2012 | Somin et al. | |
| 8,433,437 B1 | 4/2013 | Shakes et al. | |
| 8,527,325 B1 | 9/2013 | Atreya et al. | |
| 8,594,834 B1 | 11/2013 | Clark et al. | |
| 8,606,392 B2 | 12/2013 | Wurman et al. | |
| 8,626,335 B2 | 1/2014 | Wurman et al. | |
| 8,639,382 B1 | 1/2014 | Clark et al. | |
| 8,718,814 B1 | 5/2014 | Clark et al. | |
| 8,798,784 B1 | 8/2014 | Clark et al. | |
| 8,798,786 B2 | 8/2014 | Wurman et al. | |
| 8,805,573 B2 | 8/2014 | Brunner et al. | |
| 8,805,574 B2 | 8/2014 | Stevens et al. | |
| 8,825,197 B1 | 9/2014 | Guan | |
| 8,831,984 B2 | 9/2014 | Hoffman et al. | |
| 8,892,240 B1 | 11/2014 | Vliet et al. | |
| 8,909,368 B2 | 12/2014 | D'Andrea et al. | |
| 8,930,133 B2 | 1/2015 | Wurman et al. | |
| 8,958,903 B1 | 2/2015 | Rotella et al. | |
| 8,965,562 B1 | 2/2015 | Wurman et al. | |
| 8,972,045 B1 | 3/2015 | Mountz et al. | |
| 9,008,827 B1 | 4/2015 | Dwarakanath et al. | |
| 9,008,829 B2 | 4/2015 | Worsley | |
| 9,656,805 B1 | 5/2017 | Evans et al. | |
| 9,764,836 B1* | 9/2017 | Elzinga | ................ B64C 39/024 |
| 9,916,562 B1 | 3/2018 | Armato | |
| 2008/0040182 A1 | 2/2008 | Wegner et al. | |
| 2008/0167884 A1 | 7/2008 | Mountz et al. | |
| 2011/0103924 A1 | 5/2011 | Watt et al. | |
| 2011/0153063 A1 | 6/2011 | Wurman et al. | |
| 2013/0054005 A1 | 2/2013 | Stevens et al. | |
| 2013/0103552 A1 | 4/2013 | Hoffman et al. | |
| 2013/0173049 A1 | 7/2013 | Brunner et al. | |
| 2014/0195040 A1 | 7/2014 | Wurman et al. | |
| 2014/0350831 A1 | 11/2014 | Hoffman et al. | |
| 2015/0151912 A1 | 6/2015 | Mountz et al. | |
| 2015/0151913 A1 | 6/2015 | Wong et al. | |
| 2015/0202770 A1 | 7/2015 | Patron et al. | |
| 2015/0336270 A1 | 11/2015 | Storr | |
| 2015/0353280 A1 | 12/2015 | Brazeau et al. | |
| 2015/0353282 A1 | 12/2015 | Mansfield et al. | |
| 2016/0019497 A1 | 1/2016 | Carvajal | |
| 2016/0236867 A1 | 8/2016 | Brazeau et al. | |
| 2016/0292634 A1* | 10/2016 | Mehring | ............ G06Q 10/0832 |
| 2017/0088360 A1 | 3/2017 | Brazeau et al. | |
| 2017/0136931 A1 | 5/2017 | Colantonio et al. | |
| 2017/0161486 A1* | 6/2017 | Jeon | ...................... H04L 63/083 |
| 2017/0217683 A1 | 8/2017 | Lyon et al. | |
| 2018/0032949 A1 | 2/2018 | Galluzzo et al. | |
| 2018/0058739 A1 | 3/2018 | Zou | |
| 2018/0074504 A1 | 3/2018 | Shydo, Jr. | |
| 2018/0086353 A1 | 3/2018 | Holbrooke et al. | |
| 2018/0086561 A1 | 3/2018 | Stubbs et al. | |
| 2018/0357848 A1* | 12/2018 | McLellan | ............... E05B 47/00 |
| 2019/0072979 A1* | 3/2019 | Sukhomlinov | ........ G06Q 20/14 |
| 2020/0065748 A1 | 2/2020 | Durkee et al. | |
| 2020/0122927 A1* | 4/2020 | Bellar | .................. G05D 1/0297 |
| 2020/0219348 A1* | 7/2020 | Hanlon | .................... G07C 9/21 |
| 2020/0225665 A1 | 7/2020 | Rongley | |
| 2020/0364652 A1 | 11/2020 | Rongley | |
| 2021/0073716 A1* | 3/2021 | Dearing | ............ G07C 9/00896 |

FOREIGN PATENT DOCUMENTS

| | | |
|---|---|---|
| CN | 105314315 B | 12/2017 |
| EP | 1590272 B1 | 8/2010 |
| KR | 20190070700 A | 6/2019 |
| WO | 2007149194 A2 | 12/2007 |
| WO | 2007149703 A2 | 12/2007 |

OTHER PUBLICATIONS

Thomas, Shane, "International Search Report and Written Opion Regarding International Application No. PCT/US20/31634", dated Aug. 7, 2020, p. 9, Published in: US.

Young, Lee, "International Search Report and Written Opinion Regarding International Application No. PCT/US2019/65377", dated Mar. 30, 2020, p. 23, Published in: US.

Lee Young, "International Search Report and Written Opinion Regarding International Application No. PCT/US20/31631", dated Aug. 4, 2020, p. 16, Published in: US.

Cooley, Chase Littlejohn, "Office Action Reguarding U.S. Appl. No. 16/708,618", dated Jul. 7, 2021, p. 56, Published in: US.

Thomas, Shane, "International Search Report and Written Opinion Regarding International Application No. PCT/US21/21482", dated Jul. 19, 2021, p. 25, Published in: US.

* cited by examiner

SYSTEMS, METHODS, COMPUTING PLATFORMS, AND STORAGE MEDIA FOR DIRECTING AND CONTROLLING A SUPPLY CHAIN CONTROL TERRITORY IN AN AUTONOMOUS INVENTORY MANAGEMENT SYSTEM

CROSS-REFERENCE TO RELATED APPLICATIONS

The present application is related to U.S. Provisional Application Ser. Nos. 62/778,127 and 62/778,131, the contents of which are incorporated herein by reference in their entirety and for all proper purposes. The present Application for Patent claims priority to U.S. Provisional Application Nos. 62/844,248 and 62/844,243, both filed May 7, 2019 and assigned to the assignee hereof, the contents of which are hereby expressly incorporated by reference herein.

FIELD OF THE DISCLOSURE

The present disclosure relates to systems, methods, computing platforms, and storage media for directing and controlling an autonomous storage unit in a control territory.

BACKGROUND

The field of automation is rapidly expanding into non-traditional functions, for instance, within the inventory management systems industry. Automation has become common in numerous applications, including online retail (e.g., warehousing, manufacturing, etc.) and airport luggage handling. In some cases, automation creates distinct advantages including higher uptime and lower revolving costs over the traditional labor force. It is estimated that automation will continue to become more prevalent in performing traditional labor tasks in these, and additional industries in the future.

While automation has contributed to lower costs and higher uptimes in supply chains, the rigidity and lack of awareness of current automation systems also presents numerous problems. In some cases, the centralized nature of the logic architecture controlling the robot fleets lacks scalability and leads to increased latency. For instance, current automation hardware relies on a set of instructions received from a central processing system for transporting goods. However, technological challenges arise when an autonomous operation is required from the automation system in conjunction with additional tasks, such as when an autonomous response to inventory demands is needed along with the transportation of goods. The limited capability of current robots to adapt logistically within the same or a different geographic site, particularly in response to inventory demands, has prevented automation systems from expanding beyond their currently limited capabilities.

Logistics capability aside, current techniques for warehouse and supply chain automation systems include robots with limited intelligence and functionality. In some cases, such robots are configured to dock with specially modified shelves by driving under them, lifting them up, and transporting them from one point to another. While these robots have brought about some advances in inventory handling and transport, the shelves themselves have not evolved much. In other words, the shelves utilized in current warehouse automation systems have no added functionality beyond providing storage space for inventory. It should be noted, however, that these robots are in no way "intelligent", since they are not only unaware of the inventory they are carrying and transporting (e.g., inventory levels of different items), but also any goals or targets pertaining to that inventory (e.g., varying priorities for different inventory requests/demands, sensitivity of inventory to vibrations, temperature, humidity, light, etc.). While current techniques exist for tracking individual robots and their inventory, the processing burden lies almost entirely with the central processing system. Besides being difficult to implement, such techniques also suffer from latency issues.

Thus, there is a need for a flexible, intelligent, and autonomous robot that can be directed and controlled in an autonomous inventory management system for dynamically responding to inventory demands at more than one geographic site based on defined sets of goals and targets.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. It should be noted that the terms robot, autonomous storage unit, autonomous inventory storage unit, inventory storage robot, autonomous inventory robot, or mobile inventory transportation unit (MITU) may be used interchangeably throughout this application and may be applied to similar systems outside of the warehouse and supply chain industry. Further, the terms inventory storage device, storage device, shelf, or storage container may be used interchangeably throughout this application. The terms controller, central system, central processing system, control system may also be used interchangeably throughout this disclosure. Lastly, the terms geographic region, geographic territory, control territory, and location may be used to refer a geographic area assigned to a controller or central system.

In order to address the deficiencies in the current technology, disclosed herein is a system and a method for directing and controlling an autonomous inventory storage unit operating in a supply chain control territory. The present disclosure is generally directed to controlling robots or autonomous inventory storage units used in manufacturing, warehouse, and retail supply chains. It is contemplated that autonomous inventory storage units may travel between different control territories, such as warehouse and retail control territories. In other words, autonomous storage units may be employed to move goods or inventory items not just between two points within a closed environment like a warehouse or retail store, but also out into the wider world.

One aspect of the present disclosure relates to a system configured for directing and controlling an autonomous inventory storage unit in an autonomous inventory management system. The system may include the autonomous inventory storage unit, wherein the autonomous storage unit comprises one or more hardware processors configured by machine-readable instructions, a housing, an inventory storage device, wherein the inventory storage device is physically coupled to the housing, a power device, wherein the power device is operationally configured to supply power to the electrical components of the autonomous inventory storage unit, a drive device, wherein the drive device is in electrical communication with the power device, and is operationally configured to physically move the autonomous inventory storage unit in one or more control territories, a navigation device, wherein the navigation device is in electrical communication with the power device, and is operationally configured to transmit and receive geographic data and determine the physical location of the autonomous inventory storage unit, a sensing device, wherein the sensing device is in electrical communication with the power device, and is operationally configured to detect physical objects and transmit and receive physical object data, and a control device, wherein the control device is in electrical communication with the power device, the drive device, the navigation device, and the sensing device, and is operationally configured to control the autonomous inventory storage unit and transmit and receive data from physically separate systems, wherein the physically separate systems comprises a transport (or transportation) system, a central system, such as a master or visiting territory controller, or another autonomous storage unit. The system may further include a transportation system comprising a transport controller, the transport controller operationally configured to transmit to and receive data from the autonomous inventory storage unit and other secondary systems, and wherein the transportation system is operationally configured to physically receive the autonomous inventory storage unit, and physically transport the autonomous inventory storage unit between the one or more control territories, and a first controller, wherein the first controller is assigned to a first control territory, and wherein the first controller is in communication with the control device of the autonomous inventory storage unit, the transport controller, and a second controller.

The system may comprise one or more hardware processor(s) configured by machine-readable instructions to negotiate, by the first controller, a dispatch routine for the autonomous inventory storage unit with one or more of the transport controller and the second controller, wherein the autonomous inventory storage unit is configured to transport an inventory item; assign an authentication token to the autonomous inventory storage unit and the second controller, the authentication token providing an identification signal between the autonomous inventory storage unit and the second controller; register, by the autonomous inventory storage unit, a departure event with the first controller; provide a secure connection between the autonomous inventory storage unit and the second controller; exchange the authentication token between the autonomous storage unit and the second controller; authenticate the secure connection between the autonomous inventory storage unit and the second controller based at least in part on exchanging the authentication token; and give, by the second controller, the autonomous inventory storage unit permission to access a second control territory at a delivery location, the second controller assigned to the second control territory.

Another aspect of the present disclosure relates to a method for directing and controlling an autonomous inventory storage unit in an autonomous inventory management system. The method may include negotiating, by a first controller, a dispatch routine for the autonomous inventory storage unit with one or more a transport controller and a second controller, the autonomous inventory storage unit configured to transport an inventory item, and wherein the first controller is assigned to a first control territory, and the second controller is assigned to a second control territory. The method may include assigning an authentication token to the autonomous inventory storage unit and the second controller, the authentication token providing an identification signal between the autonomous inventory storage unit and the second controller. The method may include registering a departure event with the first controller. The method may include providing a secure connection between the autonomous inventory storage unit and the second controller. The method may include exchanging the authentication token between the autonomous inventory storage unit and the second controller. The method may include authenticating the secure connection between the autonomous inventory storage unit and the second controller based at least in part on exchanging the authentication token; and giving, by the second controller, the autonomous inventory storage unit permission to access the second control territory at the delivery location.

Yet another aspect of the present disclosure relates to a computing platform configured for directing and controlling an autonomous inventory storage unit in an autonomous inventory management system. The computing platform may include a non-transient computer-readable storage medium having executable instructions embodied thereon. The computing platform may include one or more hardware processors configured to execute the instructions. The processor(s) may execute the instructions to negotiate, by the first controller, a dispatch routine for the autonomous inventory storage unit with one or more of the transport controller and the second controller, wherein the autonomous inventory storage unit is configured to transport an inventory item; assign an authentication token to the autonomous inventory storage unit and the second controller, the authentication token providing an identification signal between the autonomous inventory storage unit and the second controller; register, by the autonomous inventory storage unit, a departure event with the first controller; provide a secure connection between the autonomous inventory storage unit and the second controller; exchange the authentication token between the autonomous storage unit and the second controller; authenticate the secure connection between the autonomous inventory storage unit and the second controller based at least in part on exchanging the authentication token; and give, by the second controller, the autonomous inventory storage unit permission to access a second control territory at a delivery location, the second controller assigned to the second control territory.

Still another aspect of the present disclosure relates to a system configured for directing and controlling an autonomous inventory storage unit in an autonomous inventory management system. The system may include means for negotiating, by a first controller, a dispatch routine for the autonomous inventory storage unit with one or more a transport controller and a second controller, the autonomous inventory storage unit configured to transport an inventory item, and wherein the first controller is assigned to a first control territory, and the second controller is assigned to a second control territory. The system may include means for assigning an authentication token to the autonomous inventory storage unit and the second controller, the authentication token providing an identification signal between the autonomous inventory storage unit and the second controller. The system may include means for registering a departure event with the first controller. The system may include means for providing a secure connection between the autonomous inventory storage unit and the second controller. The system may include means for exchanging the authentication token between the autonomous inventory storage unit and the second controller. The system may include means for authenticating the secure connection between the autonomous inventory storage unit and the second controller based at least in part on exchanging the authentication token; and means for giving, by the second controller, the autonomous inventory storage unit permission to access the second control territory at the delivery location.

Even another aspect of the present disclosure relates to a non-transient computer-readable storage medium having instructions embodied thereon, the instructions being executable by one or more processors to perform a method for directing and controlling an autonomous inventory storage unit in an autonomous inventory management system. The method may include negotiating, by a first controller, a dispatch routine for the autonomous inventory storage unit with one or more a transport controller and a second controller, the autonomous inventory storage unit configured to transport an inventory item, and wherein the first controller is assigned to a first control territory, and the second controller is assigned to a second control territory. The method may include assigning an authentication token to the autonomous inventory storage unit and the second controller, the authentication token providing an identification signal between the autonomous inventory storage unit and the second controller. The method may include registering a departure event with the first controller. The method may include providing a secure connection between the autonomous inventory storage unit and the second controller. The method may include exchanging the authentication token between the autonomous inventory storage unit and the second controller. The method may include authenticating the secure connection between the autonomous inventory storage unit and the second controller based at least in part on exchanging the authentication token; and giving, by the second controller, the autonomous inventory storage unit permission to access the second control territory at the delivery location.

In some examples of the method, system, computing platform, and non-transient computer-readable storage medium described above, the dispatch routine is further negotiated with one or more of a client and a way station. In some cases, a way station may also be referred to as a waystation, a waypoint, or a cross docking facility. During its journey from a master control territory to a host (or visiting) control territory, an autonomous storage unit may enter and depart a plurality of control territories, such as, but not limited to: master control territory to a first transport control territory, first transport control territory to way station control territory (optional), way station control territory to second transport control territory (optional), second transport control territory to second controller, and so on.

Some examples of the method, system, computing platform, and non-transient computer-readable storage medium described above may further include processes, features, means, or instructions for providing a second secure connection between the autonomous inventory storage unit and the transport controller, wherein the second secure connection is based at least in part on an authentication handshake between the autonomous inventory storage unit and the transport controller; and giving, by the transport controller, the autonomous inventory storage unit permission to enter the transportation system assigned to the transport controller.

Some examples of the method, system, computing platform, and non-transient computer-readable storage medium described above may further include processes, features, means, or instructions for providing, by the transport controller, a transport route to the autonomous inventory storage unit, the transport route including information about permitted parking areas, drive paths and building access instructions; and sending, by the transport controller, a signal to the autonomous inventory storage unit when the transportation system assigned to the transport controller arrives at the delivery location.

In some examples of the method, system, computing platform, and non-transient computer-readable storage medium described above the second controller conveys site data associated with the second control territory to the autonomous inventory storage unit. In some examples of the method, system, computing platform, and non-transient computer-readable storage medium described above the site date associated with the second control territory comprises one or more of: permitted drive paths, waiting areas, building access codes, and charging station locations in the second control territory.

Some examples of the method, system, computing platform, and non-transient computer-readable storage medium described above may further include processes, features, means, or instructions for depositing, by the autonomous inventory storage unit, the inventory item at the delivery location; and accepting, by the autonomous inventory storage unit, a second inventory item from the delivery location.

In some examples of the method, system, computing platform, and non-transient computer-readable storage medium described above the autonomous inventory storage unit negotiates a second dispatch routine with one or more of the first controller, the second controller, and the transport controller.

Some examples of the method, system, computing platform, and non-transient computer-readable storage medium described above may further include processes, features, means, or instructions for identifying a hostage event for the autonomous storage unit in the second control territory, the hostage event comprising at least a physical blocking of the autonomous storage unit, and transmitting, by the autonomous storage unit, an alert to the first controller based in part on identifying the hostage event.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
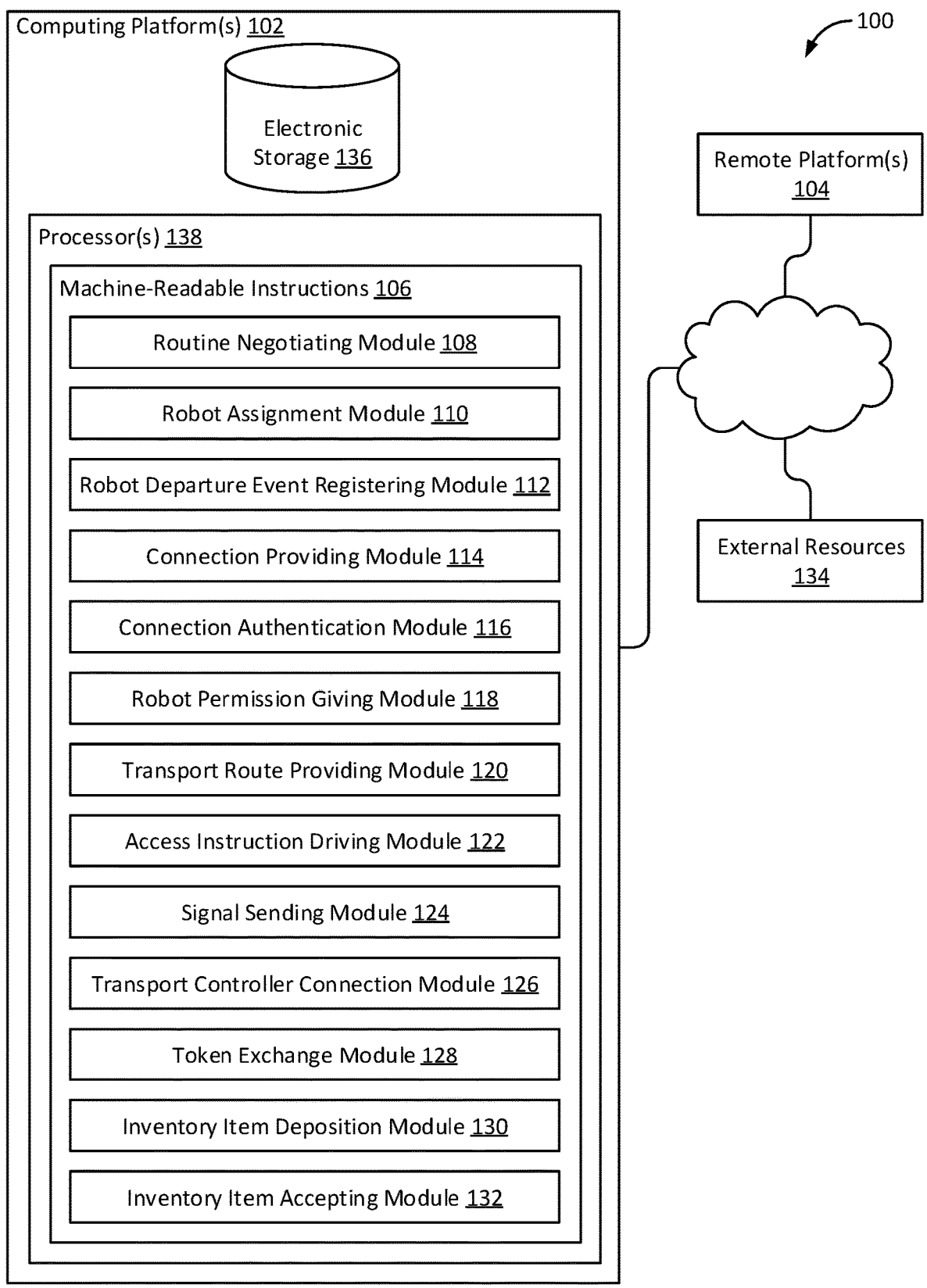
FIG. 1 illustrates a system configured for directing and controlling a supply chain control territory in an autonomous inventory management system, in accordance with one or more implementations.

The words "for example" is used herein to mean "serving as an example, instance, or illustration." Any embodiment described herein as "for example" is not necessarily to be construed as preferred or advantageous over other embodiments.

While aspects of this disclosure are envisioned for the control of autonomous storage units or robots used in manufacturing and retail supply chains, the same or similar principles may apply to other use cases where robots leave one space and enter another. In some cases, such spaces may be configured for either private or public use, and may include private homes or residences, retail stores, warehouses, factories and/or manufacturing facilities, to name a few non-limiting examples.

The present disclosure is generally directed to controlling robots or autonomous inventory storage units used in manufacturing and retail supply chains. It is contemplated that autonomous inventory storage units may travel between different control territories, such as warehouse and retail control territories. In other words, autonomous storage units may be employed to move goods or inventory items not just between two points within a closed environment like a warehouse or retail store, but also out into the wider world.

In some embodiments of the disclosure, the original or master control territory may be configured to delegate control of the autonomous inventory storage unit to the host or visiting territory, for instance, when the autonomous storage unit is within the host or visiting territory. In some cases, the master territory may delegate control of the autonomous storage unit to the host or visiting territory, where the delegated control may include one or more of: controlling robot's access within the visiting territory, time based access within the control territory (e.g., autonomous storage unit may only remain in public areas of store from 7 AM to 9 PM), assign tasks to the robot (e.g., robot shelves should be stocked with milk cartons and robot should relocate to dairy aisle), assign a set time by which robot has to complete said tasks (e.g., robot should be stocked with milk cartons and should relocate to the dairy aisle by 8 AM), etc. In some examples, the master territory may also include exceptions with regards to the delegated control. For instance, the master territory may specify that the host or visiting territory does not have permission to change a prescribed date or time for when the robot should leave the host territory and return to the master territory. In such cases, the master territory may retain control of the same.

In some cases, the master territory may delegate one or more levels of control to the host or visiting territory, the autonomous storage unit, and optionally the transportation system or transport controller. In other words, the master territory controller may split the control in the supply chain territory into multiple layers or levels and may assign different layers or levels to other parties (e.g., visiting territory controller, transport controller, etc.). At a core level, the control may include rules that all robots must adhere to, such as not injuring humans or animals. In another case, one level or layer of control may be related to the recharge priority for different robots. It should be noted that robots or autonomous storage units from multiple suppliers may be granted access to a host control territory, such as a retail store, and hence the host controller may streamline operations within its territory by allocating priorities to different robots to prevent over-utilization of resources.

Some aspects of the disclosure may relate to monitoring and tracking of individual robots not only within the master control territory, but also at host or visiting control territories. In some cases, a master control territory may track and monitor autonomous storage units dispatched for meeting inventory demands at another geographic location. In some embodiments, a central system at the master control territory may indicate one or more rules, such as a frequency of communication (i.e., how often to communicate), subject matter of communication (i.e., what to communicate), network security rules for communication, rules to adhere to at the host or visiting territory, etc., to an autonomous storage unit. In some examples, the central system may indicate these rules prior to the autonomous storage unit's departure from the master control territory. In some cases, the autonomous storage unit may also be expected to obey rules (e.g., network security rules, rules to adhere to at the visiting territory) set out by a central system or controller at the host or visiting territory. In some cases, the rules set out by the central system at the host control territory may conflict with the rules set out by the central system at the master control territory. In other words, while the autonomous storage unit may arrive with an expectation of the rules it will need to adhere to at the host control territory, it may realize, during the authentication handshake, that one or more rules may have been changed by the host controller for the robot once onsite. In such cases, the robot or the autonomous storage unit may determine whether to agree to the new rules and enter the host control territory, for instance, based on an internal set of rules. In other cases, the autonomous storage unit may be configured to communicate the new rules to the controller or central system at the master territory. The controller at the master territory may be configured to assess the new rules and one of grant or deny permission to the autonomous storage unit to agree to the new rules and enter the host control territory. If the controller at the master territory denies the permission, the autonomous storage unit may be configured to board the next available transportation system and return to the master control territory.

As an example, a first use case describes an ice cream manufacturer replenishing an ice cream shelf in a grocery store. The grocery store may transmit a request for replenishment of a shelf of mint ice cream from the ice cream manufacturer. Further, the manufacturer may load one or more units of mint ice cream into a robot or autonomous storage unit. In some cases, the autonomous storage unit may be an example of a robotic inventory management device. The autonomous storage unit or robot may comprise an inventory storage device, a power device, one or more sensors, as well as a computing device, further described in relation to FIGS. 6 and 7. In some embodiments, the autonomous storage unit may comprise a wireless communication system, which may allow it to wirelessly connect to the internet. Additionally or alternatively, the autonomous storage unit may also comprise Bluetooth transceivers and/or Near Field Communication (NFC) systems for communicating with one or more of a central system, such as a master territory controller and/or a destination territory controller, a transport controller or transportation system, NFC, Wi-Fi, or Bluetooth capable devices (e.g., elevators with NFC readers, smartphones, tablets, laptops, etc.), and even other autonomous storage units.

In some embodiments, the autonomous storage unit may be configured to serve as a point of sale within the grocery store. For instance, the robot or autonomous storage unit may include capabilities for making or accepting payments, such as credit card payments, NFC payments, wire transfers, etc., via one or more of the wireless, Bluetooth, and NFC systems. In some cases, a user or customer may need to set up a payment account with the retail system (or grocery store), or an autonomous storage unit operating within the retail system. In such cases, the autonomous storage unit may utilize one or more of facial recognition technology, a finger-print reader, iris scanner, voice recognition, or any other identification techniques to confirm the user's identity and charge their account accordingly. In some other cases, the autonomous storage unit may require the user to present a credit card, Europay, Mastercard and Visa (EMV) card, or mobile phone (e.g., if the user has set up a digital wallet) if the user would like to complete their transaction at the storage unit. In yet other cases, the user may have pre-authorized robots or autonomous storage units operating in the retail system to automatically charge their payment accounts when one or more items are removed from the shelves. In such cases, the autonomous storage unit may charge the user's payment account after confirming the identity of the user (e.g., visual identification, voice recognition, etc.) or via NFC payment technology, the latter of which may require the user to be within a certain distance from the NFC reader of the autonomous storage unit. In some examples, the autonomous storage unit may identify one or more items removed from its shelves and relay an indication of the same to a cashier or check out system at the retail store. In this way, the cashier may verify the items identified by the storage unit and make any required corrections (e.g., 10 oz packet of potato chips incorrectly identified as 16 oz packet, organic apples incorrectly identified as regular apples, etc.), to the customer's purchase order prior to accepting payment. Besides the financial impacts to the customer and/or the store, for instance, due to overpaying or underpaying by the customer, the corrections input by the cashier may be utilized to improve the inventory item identification capabilities of the autonomous storage unit. In one example, the input received from multiple cashiers or check out stations, along with inventory item identification information from multiple autonomous storage units, may be uploaded to a cloud computing platform utilizing deep learning or artificial intelligence algorithms, which may serve to optimize inventory item identification and checkout at storage units.

In some embodiments, the autonomous storage unit or robot may be configured to autonomously move within a geographic region, or even between different geographic regions. Returning to the above example, after being stocked by the ice cream manufacturer, the autonomous storage unit may be assigned a route to the grocery store by a central system at the ice cream manufacturer. In some cases, a central system at the originating location may also be referred to as a master controller or a master territory controller. In other cases, the autonomous storage unit may be configured to determine its own route to the grocery store, for instance, via the use of a transportation system. In some examples, transportation systems may include road transport, such as automobiles and trucks, air transport, such as planes and helicopters, rail transport, such as trains, trams, light rail, and waterways transport, such as boats, ships, and hovercrafts. It should be noted that these transportation systems are merely examples, and different transportation systems, not listed, may be contemplated in other embodiments.

After the autonomous storage unit has been scheduled (i.e., individually or by the master controller) for transport from the manufacturer's location to the grocery store, the autonomous storage unit may relocate itself to a dispatch location in the manufacturer's facility for transport to the grocery store. In some aspects, a robot or autonomous storage unit navigating within a factory may resemble a closed system. However, according to this disclosure, robots or autonomous storage units may also be configured to leave the manufacturer's facility or warehouse into the open world. Besides delivering items to private homes or grocery stores, the autonomous storage unit may also be configured to accept items for transport back to the warehouse or manufacturer. In some cases, the autonomous storage unit may be configured to scan a barcode, Radio Frequency Identification (RFID) tag, Quick Response (QR) code, etc., associated with the returned item to verify that the returned item matches the item listed for return by a customer. In some cases, the autonomous storage unit may also comprise a built-in weigh scale, which may allow it to verify the returned item by correlating the weight of the returned item to items in an inventory database.

In some cases, after the transportation system arrives at the dispatch location, the transportation system and autonomous storage units may be configured to perform an authentication handshake. The authentication handshake may allow the transportation system to verify the identity of the autonomous storage unit, including at least its final destination. Furthermore, after the transportation system delivers the autonomous storage unit or robot to the grocery store, there may be similar protocols for confirming and verifying the identity of the autonomous storage unit by a central system (or controller) prior to the robot gaining access to the grocery store. In some cases, a central system at the destination location may also be referred to as a destination territory controller, a host or visiting territory controller, an external control system, an external central system, or a destination/host/visiting controller. It should be noted that, for the purpose of this disclosure, the terms retail store, grocery store, destination location, and host or visiting control territory may be used interchangeably throughout this application.

In some cases, after the transportation system delivers the robot to the grocery store, the robot may connect to the control systems within the grocery store. In one example, the robot or autonomous storage unit may be provided a password or instructions for accessing the control systems at the grocery store by its master controller. In some cases, the host territory controller may provide a password and/or control system access instructions to the master controller as part of the replenishment request. In some embodiments, the controller in the master control territory may also communicate an estimated time of arrival of the autonomous storage unit, instructions for identifying the autonomous storage unit, authentication tokens, etc., to the controller in the host control territory. After connecting to the wireless network and/or control system at the grocery store, the control system may identify the robot and verify that the robot is holding the requested inventory. In some examples, following authentication, the autonomous storage unit may receive site access instructions from the host territory controller, further described in relation to the FIGS. 1 through 4 below. The autonomous storage unit may also receive a site map of the host territory, important parameters or rules that it is expected to obey in the host territory, recharge instructions, time-based access rules (e.g., autonomous storage unit should remain in a certain area of the store between 8 AM to 9 PM), etc. After delivery of the requested items (e.g., mint ice cream) to the grocery store, the autonomous storage unit may be configured to relocate to a next destination, such as another grocery or retail store, or to the master control territory.

Thus, in some aspects, the autonomous storage unit may be under the guidance of multiple control systems while at the grocery store. Specifically, the controller in the master control territory may delegate certain levels or layers (e.g., lowest level) of control of the autonomous storage unit to the host territory controller, while retaining overall or ultimate control of the autonomous storage unit. In other words, the master controller may have authority over the multiple layers of control in the supply chain territory and may select one or more of those layers to be controlled by another party, such as the host territory controller, during certain circumstances. In some examples, the host territory controller may only be delegated control of the autonomous storage unit when the storage unit is within the host territory, further described in relation to the figures below. Furthermore, the autonomous storage unit may be operationally configured to follow instructions or directions received from the master controller, in the event of receiving conflicting instructions from the host controller and the master controller. For instance, in case of a business dispute between the owner of the autonomous storage unit and a manager at the retail store, the autonomous storage unit may receive conflicting instructions from the master controller (e.g., return to the master control territory) and host controller (e.g., unlock cabinets so inventory items can be unloaded, and autonomous storage unit does not have permission to leave host control territory). In such cases, since the master controller has only delegated control of a subset, but not all, of layers to the host controller, the host controller instruction's may be overridden or ignored by the autonomous storage unit.

In some examples, host or visiting control territory system's may be configured to determine if an unauthorized robot or storage unit is attempting to gain access to its territory. In such cases, the host territory controller may take one or more measures to prevent access of the robot to its territory, which may include one or more of: directing other autonomous storage units to assemble in a wall formation to block the rogue or unauthorized robot from entering the territory, and communicating to security personnel or security systems to alert them of the attempted entry and deploy countermeasures. In some cases, grocery stores or retail stores may have security gates that can be remotely controlled by the host territory controller to prevent unauthorized robots or persons from gaining access. Additionally or alternatively, stores may have poles installed in silos in the ground. Further, these poles may be controlled by the host controller. In some cases, these poles could be raised up to block a rogue robot from entering. It should be noted that, under regular conditions, the top of these poles may be flush with the ground to allow vehicles, autonomous storage units, customers, etc., to pass freely.

In some embodiments, a similar system may be implemented for autonomous storage units or robots used for delivering goods or packages at private residences. In some cases, robots and host territory controllers (e.g., a controller installed at a private residence) may exchange authentication tokens to ensure that the robot that arrives at a person's door is the intended robot from the intended source. In some examples, after exchanging authentication tokens (i.e., authentication handshake), the robot may also indicate details of its originating location (e.g., address of warehouse or supplier) and/or its intended delivery address to the host territory controller. The host territory controller may use the provided information to confirm that the robot is at the correct delivery address prior to granting entry to the robot. In some cases, autonomous storage units may comprise one or more lockable shelves or cabinets for holding packages. Further, the autonomous storage unit or robot may be configured to confirm the identity of the person using facial recognition, iris scan, fingerprint scan, voice recognition, security key or password, etc. In some examples, after confirming the identity of the person, the robot may unlock a cabinet or shelf carrying the person's package. In other cases, the master controller may transmit a QR code to the person. The robot or autonomous storage unit may scan the QR code presented by the user on their mobile device, and unlock the particular cabinet or shelf corresponding to that QR code.

Figure 6:
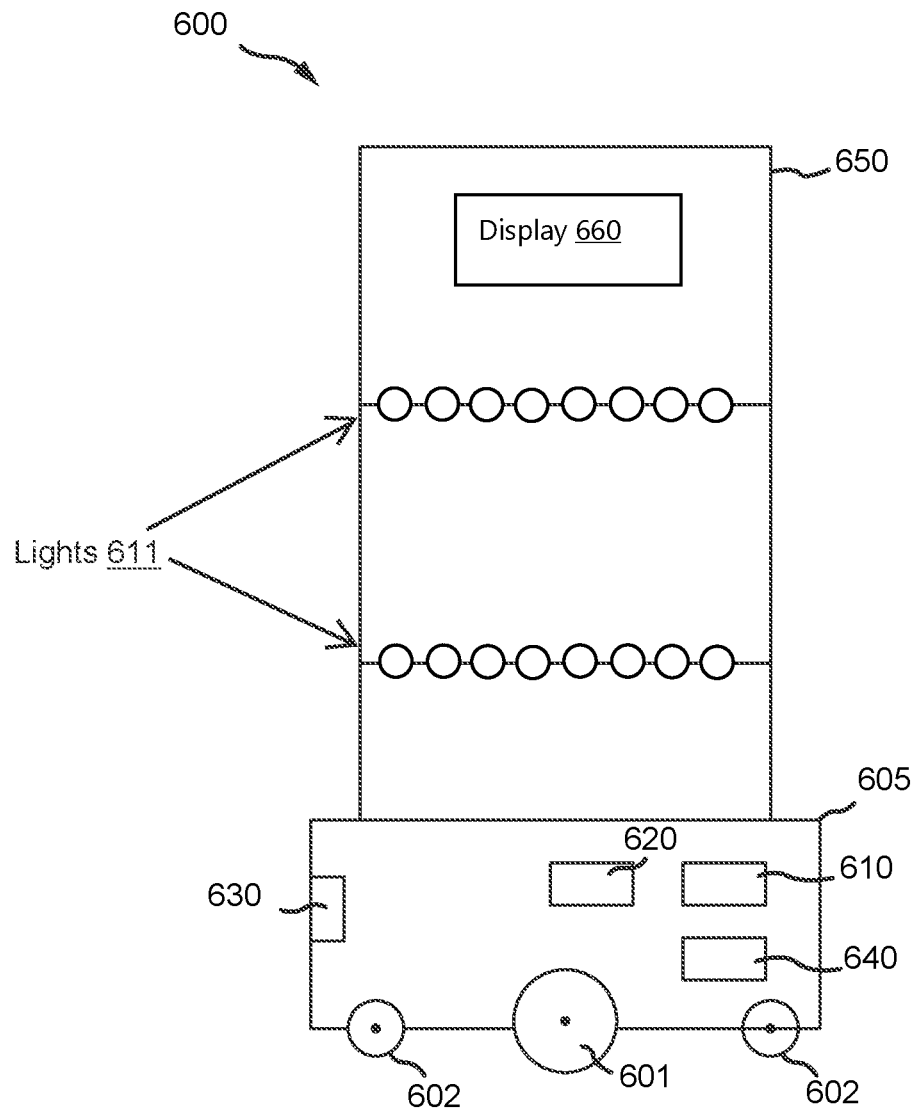
FIG. 6 illustrates a sample mobile inventory transport unit (MITU) or autonomous inventory storage unit in accordance with embodiments described herein.
Figure 7:
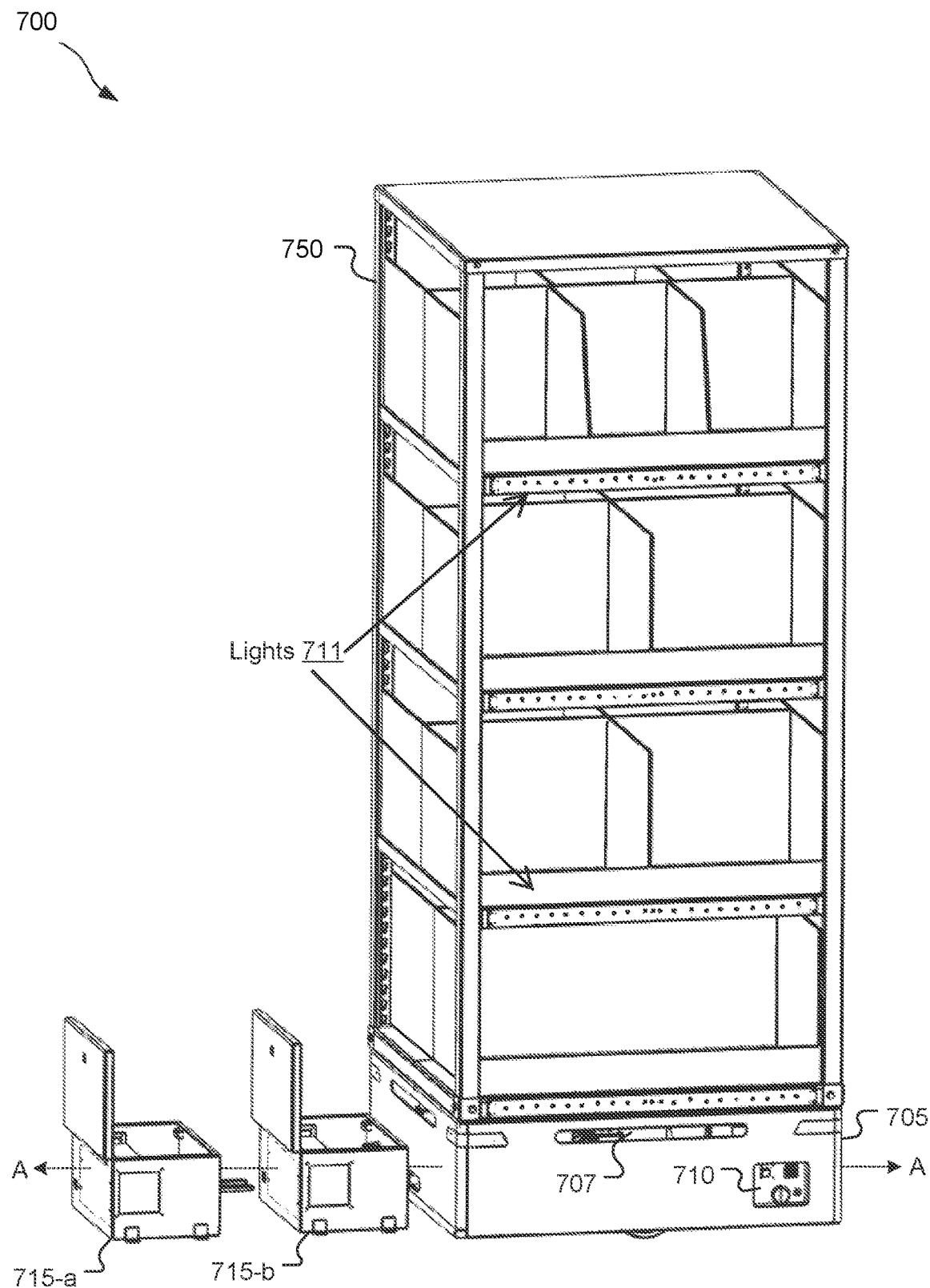
FIG. 7 is a side view of an autonomous inventory storage unit or MITU in accordance with an alternate embodiment of the disclosure.

In some examples, autonomous storage units or robots may comprise inbuilt cooling units, further described in relation to FIGS. 6 and 7. In such cases, autonomous storage units may be utilized as smart refrigerators or pantry units. For instance, autonomous storage units may be periodically delivered to users at their private residences. These autonomous storage units may be stocked with groceries, pantry staple foods, beverages, etc., pre-ordered by the user. Further, depleted autonomous storage units may be swapped out, periodically, with newly stocked autonomous storage units. In some embodiments, an autonomous storage unit may be aware of the inventory it is holding, expiration dates (if any) of the groceries, date of purchase, etc. In some cases, the storage unit may also be configured to send alerts to the user, for instance, if the inventory level of an item is below a threshold (e.g., milk gallon jug is <20% full), an item is about to expire or has already expired (e.g., salsa expiration date is in 3 days), incorrect placement of an item (e.g., milk placed on non-refrigerated shelf), etc. In some aspects, such alerts may serve to reduce food waste as well as save money for the user. In some examples, the autonomous storage unit may also be configured to suggest recipes based on the inventory items it is holding, for instance, to maximize usage of the items and mitigate food waste.

In some embodiments, if the autonomous storage unit is being utilized as a smart refrigerator, a user or host territory controller may instruct the autonomous storage unit to turn off one or more of its sensing devices (e.g., camera, microphone, etc.). Security and privacy concerns aside, turning off sensing devices may also optimize power consumption.

In some circumstances, autonomous storage units or robots may be held "hostage" at a host or visiting control territory, for instance, based on a dispute between the supplier (i.e., master control territory) and the client (i.e., host control territory). As an example, after an autonomous storage unit arrives at a client, it may receive instructions from its master controller to leave the client's control territory and return to the master territory. Further, during the hostage event, the client may block the robot from leaving by denying it permission or even physically blocking it. In order to keep track of and resolve instances of hostage robots, robots may be configured to send periodic updates (e.g., every 10 minutes, 30 minutes, 2 hours, etc.) to their master territory controller. In some cases, the periodic updates may include one or more of a current state and location of the robot, diagnostic information pertaining to the robot, and conflicting instructions with its host territory controller.

In some examples, an autonomous storage unit may also be configured to lock its inventory storage space (i.e., cabinets, shelves, etc.) to prevent theft or misuse of its inventory. In some other cases, the master controller may remotely lock the robot's inventory storage space and/or turn off the autonomous storage unit when it recognizes that the robot is being held "hostage". In some other cases, the autonomous storage unit may sound an alarm to alert passerby of an attempted theft. In yet other cases, the autonomous storage unit may send a "hostage" alert signal to a transport controller (e.g., if transportation system is still in the visiting control territory), or another autonomous storage unit, which may then relay the alert to the master controller.

FIG. 1 illustrates a system 100 configured for directing and controlling a supply chain control territory in an autonomous inventory management system, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of routine negotiating module 108, robot assignment module 110, robot departure event registering module 112, connection providing module 114, connection authentication module 116, robot permission giving module 118, transport route providing module 120, access instruction driving module 122, signal sending module 124, transport controller connection module 126, token exchange module 128, inventory item deposition module 130, inventory item accepting module 132, and/or other instruction modules.

Routine negotiating module 108 may be configured to negotiate a dispatch routine between an autonomous robot and an external control system. The robot can be an automated mechanical device configured to move within or between control territories, and may be configured to have electrical power, sensors, wireless communication, and computing power, further described in relation to FIGS. 6 and 7. The robot may gain information about its surroundings using at least one of its sensors, communication from an external control system, or communication from another controller and adjust its movement accordingly. The robot may be further configured to transport an inventory item, such as a raw material or commercial good, which may be stored or produced in a Master Control Territory as part of a supply chain. In some embodiments, the robot may be realized by a shelving unit that transports at least one inventory item and may function directly as the point of sale at a delivery location. An external control system may be the Master Control System associated with a Master Control Territory, which is the territory from which the robot originates, such as a factory or warehouse. In other cases, external control system may be associated with a host control territory, which is the destination territory for delivering inventory or packages. The external control system can be configured to control the robot via communication with system 100 while the robot is in the Master Control Territory or in a Host Control Territory, such as a transportation carrier, client, way station, or private residence, enabling the external control system to manage the robot as it moves about a supply chain control territory. By way of non-limiting example, the dispatch routine between the autonomous robot and the external control system may be further negotiated with one or more of a transportation carrier, a client, a way station, and a private residence. The robot may additionally negotiate a second dispatch routine with the external control system. A way station may be an intermediate stopping point for the robot between the host control territory and the delivery location. At a way station, the robot may, for example, receive electrical power, be serviced, or wait for a transfer between transportation carriers.

Robot assignment module 110 may be configured to assign a token (e.g., an authentication token) to the robot and the external control system, such as master territory controller, a host or visiting territory controller, or a transport controller. In some cases, the transport controller may be assigned to a transportation system. The token may provide an identification signal between the robot and the external control system. This identification signal may be sent over a form of electronic communication, such as a wireless network, to give a unique identifier associated with the robot that can, for example, be used for authentication and tracking purposes as the robot moves about a supply chain control territory.

Robot departure event registering module 112 may be configured to register a robot departure event with the external control system. A robot departure event signifies that the robot is leaving a control territory. Registering this departure event can aid the external control system in tracking the robot.

Connection providing module 114 may be configured to provide a secure connection between the robot and a first transport controller via a form of electronic communication, such as a wireless network with a WEP, WPA, or WPA2 encryption protocol. The first transport controller may be a control system in a Host Control Territory, such as a transportation carrier, client, way station, or private residence. The first transport controller may give the robot permission to access a specified travel route. For example, if the first transport controller is a control system of a transportation carrier, such as a truck, the first transport controller may give the robot permission to park within the transportation carrier as it travels along its route. Thus, the robot is given permission to access the specified travel route of the transportation carrier. This permission interaction enables the first transport controller to manage, for example, which and how many robots have access to its specific travel route.

Connection authentication module 116 may be configured to authenticate the connection between the robot and the first transport controller. As part of the authentication process the Master Control Territory may delegate varying levels of control to a Host Control Territory. For example, a Host Control Territory may be allowed to tell the robot where to go and what time to do certain things, but may be prevented from changing the prescribed date the robot should leave the Host Control Territory and return to the Master Control Territory. Based on the level of control given to a Host Control Territory, the Host Control Territory may prioritize the set of rules under which the robot operates while in its territory. Some rules may be universal for all robots, such as not harming a person, while others may be prioritized specifically by a Host Control Territory, such as when to recharge, when specific areas may be accessed by the robot, and which paths may be taken. Another part of the authentication process may include a robot sending a signal to the Master Control Territory that it has entered a specific Host Control Territory, allowing for the robot to be tracked from the Master Control Territory. This signal may be sent directly from the robot itself or via a communication network of the Host Control Territory. If the robot uses a communication network of the Host Control Territory, the robot may receive a set of rules regarding how and what it is permitted to communicate back to the Master Control Territory via this network in addition to the set of rules regarding its operation within the Host Control Territory mentioned above. If these communication rules or operational rules differ from what the robot expects, it may choose to not enter the Host Control Territory or seek other means of communication with the Master Control Territory. For example, if the Host Control Territory does not allow the robot to properly communicate its location data back to the Master Control Territory, the robot may choose to travel to a nearby, alternative Host Control Territory to update the Master Control Territory on its location.

Robot permission giving module 118 may be configured to give, by the first transport controller, the robot permission to access a specified geographic territory at a delivery location. A delivery location may be a Host Control Territory, such as a transportation carrier, client, or way station. In some cases, the delivery location is the delivery point for the at least one inventory item that may be carried by the robot. For example, if the delivery location is a retail store, the robot may be given permission to access an on-site storage facility for the delivery of at least one inventory item.

Transport route providing module 120 may be configured to provide, by the first transport controller, a transport route to the robot. The transport route may give the robot a route to take from the control territory of the first transport controller to the control territory of the delivery location. The transport route may include information about permitted parking areas where the robot can park. Depending on the delivery protocols at the delivery location, it may be necessary for the robot to park in a permitted parking area and wait for some time. For example, if the robot is not permitted access to the facility at the delivery location until a given time of day, the robot may use a permitted parking area or holding area to wait until the specified time.

Access instruction driving module 122 may be configured to provide, to the autonomous storage unit or robot, drive paths and building access instructions. In some examples, delivery locations may specify building access instructions, such as the time of day to enter the building and which doors or access ports to use. For example, some delivery locations may prevent the robot from entering the building during business hours while customers or employees are present in the building.

Signal sending module 124 may be configured to send, by the first transport controller, a signal to the robot when it arrives at a destination.

Transport controller connection module 126 may be configured to connect, by the robot, to a second transport controller, the second transport controller assigned to the destination. The second transport controller may convey site data to the robot. The site data may consist of permitted drive paths, waiting areas or holding areas, building access codes for restricted areas, and charging station locations. In some cases, the robot may go to a charging station to recharge with electrical power as needed, or when directed to do so via communication from the external control system or from another controller. Charging stations may be located at any control territory and be distributed according to power needs.

Token exchange module 128 may be configured to connect, by the robot, to the second transport controller and exchange the previously assigned token.

Inventory item deposition module 130 may be configured to deposit, by the robot, the inventory item at the delivery location.

Inventory item accepting module 132 may be configured to accept, by the robot, a second inventory item from the delivery location.

In some implementations, server(s) 102, client computing platform(s) 104, and/or external resources 134 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 134 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 134, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 134 may include sources of information outside of system 100, external entities participating with system 100, and/or other resources. In some implementations, some or all of the functionality attributed herein to external resources 134 may be provided by resources included in system 100.

Server(s) 102 may include electronic storage 136, one or more processors 138, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 136 may comprise non-transitory storage media that electronically stores information. The electronic storage media of electronic storage 136 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 may include one or more virtual storage resources (e.g., cloud storage, a virtual private network, and/or other virtual storage resources). Electronic storage 136 may store software algorithms, information determined by processor(s) 138, information received from server(s) 102, information received from client computing platform(s) 104, and/or other information that enables server(s) 102 to function as described herein.

Processor(s) 138 may be configured to provide information processing capabilities in server(s) 102. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some implementations, processor(s) 138 may include a plurality of processing units. These processing units may be physically located within the same device, or processor(s) 138 may represent processing functionality of a plurality of devices operating in coordination. Processor(s) 138 may be configured to execute modules 108, 110, 112, 114, 116, 118, 120, 122, 124, 126, 128, 130, and/or 132, and/or other modules. Processor(s) 138 may be configured to execute modules 108, 110, 112, 114, 116, 118, 120, 122, 124, 126, 128, 130, and/or 132, and/or other modules by software; hardware; firmware; some combination of software, hardware, and/or firmware; and/or other mechanisms for configuring processing capabilities on processor(s) 138. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, and/or 132 are illustrated in FIG. 1 as being implemented within a single processing unit, in implementations in which processor(s) 138 includes multiple processing units, one or more of modules 108, 110, 112, 114, 116, 118, 120, 122, 124, 126, 128, 130, and/or 132 may be implemented remotely from the other modules. The description of the functionality provided by the different modules 108, 110, 112, 114, 116, 118, 120, 122, 124, 126, 128, 130, and/or 132 described below is for illustrative purposes, and is not intended to be limiting, as any of modules 108, 110, 112, 114, 116, 118, 120, 122, 124, 126, 128, 130, and/or 132 may provide more or less functionality than is described. For example, one or more of modules 108, 110, 112, 114, 116, 118, 120, 122, 124, 126, 128, 130, and/or 132 may be eliminated, and some or all of its functionality may be provided by other ones of modules 108, 110, 112, 114, 116, 118, 120, 122, 124, 126, 128, 130, and/or 132. As another example, processor(s) 138 may be configured to execute one or more additional modules that may perform some or all of the functionality attributed below to one of modules 108, 110, 112, 114, 116, 118, 120, 122, 124, 126, 128, 130, and/or 132.

Figure 2A:
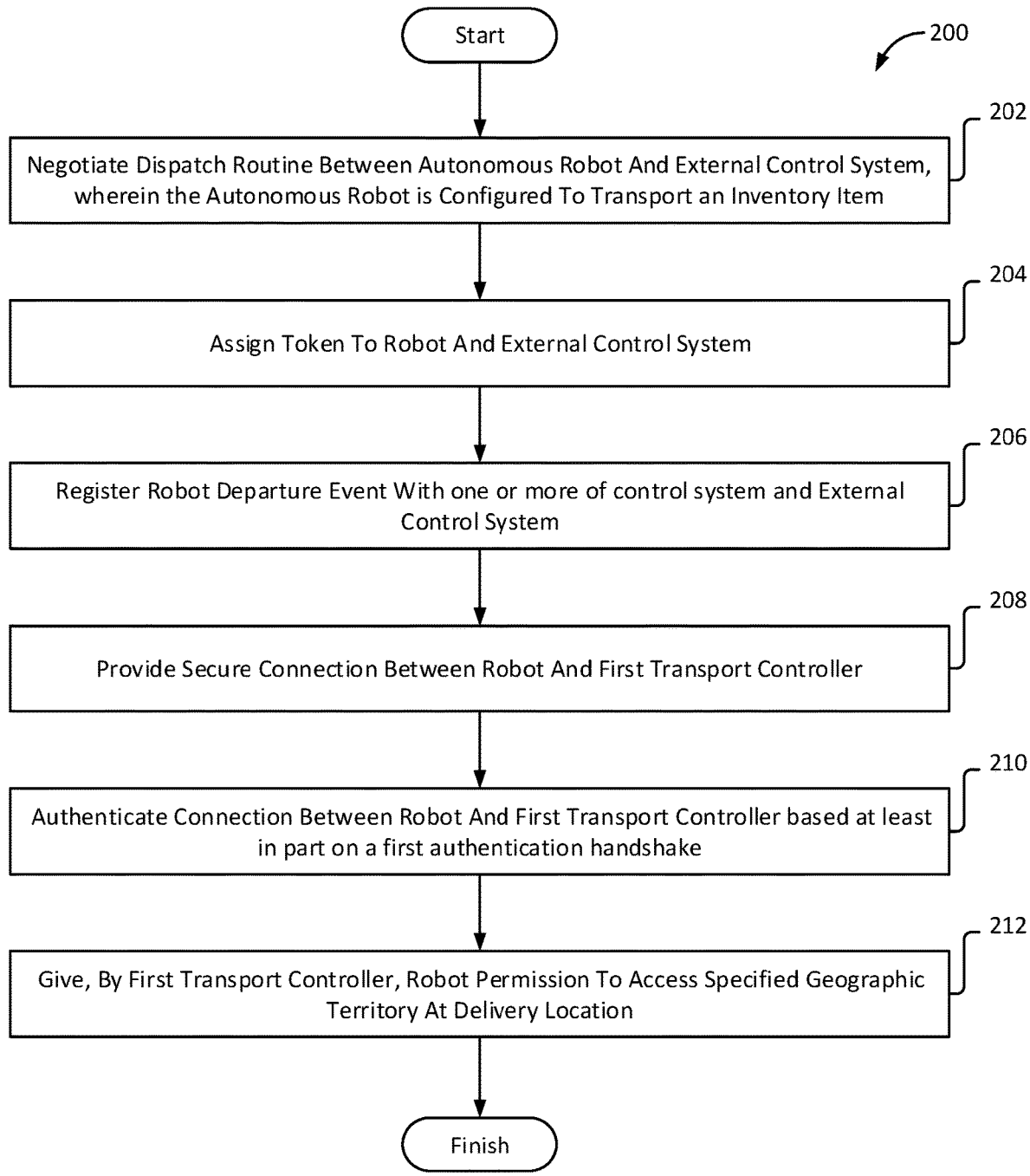
FIGS. 2A, 2B, 2C, and 2D illustrate methods for directing and controlling a supply chain control territory in an autonomous inventory management system, in accordance with one or more implementations.
Figure 2B:
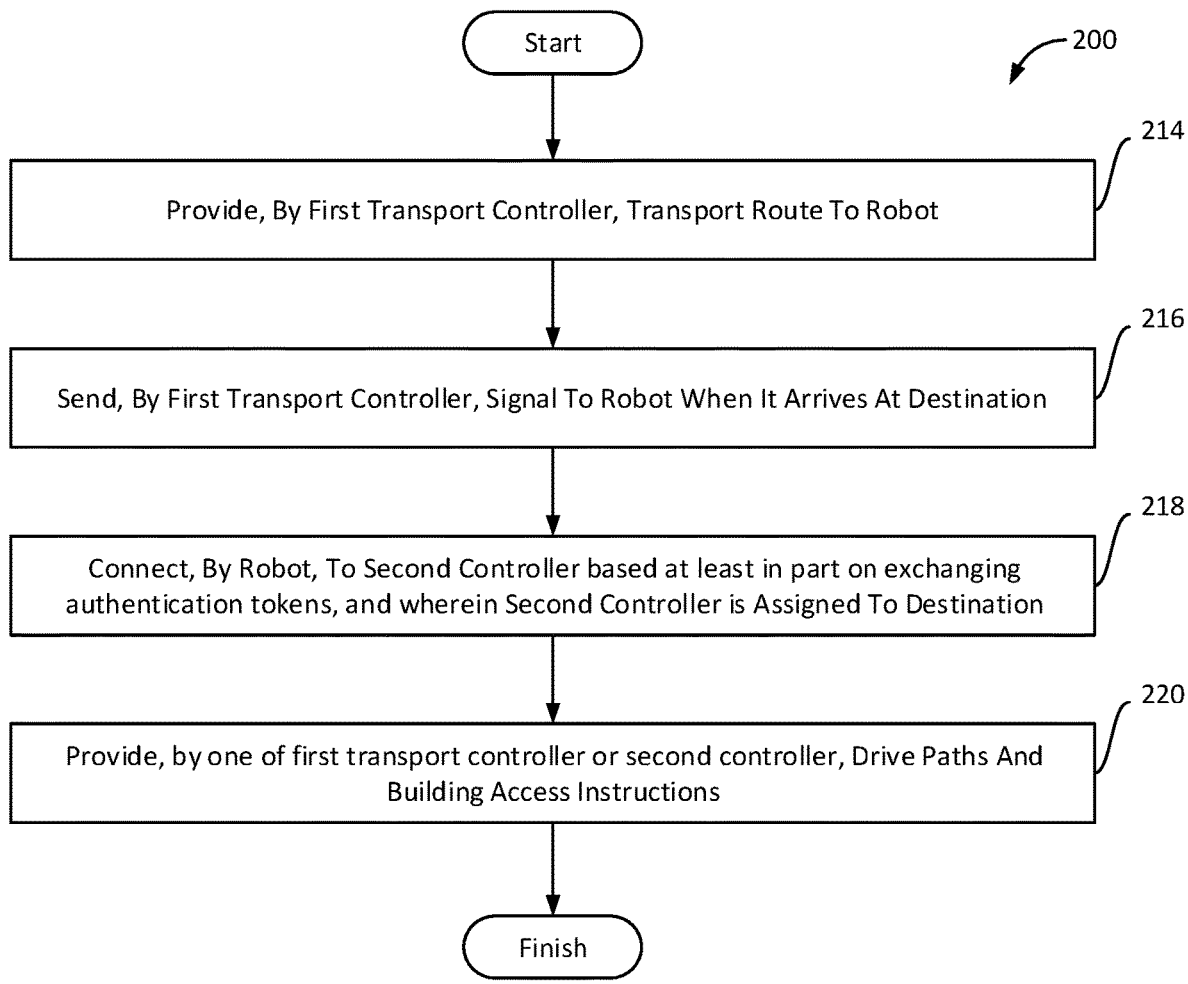
Figure 2C:
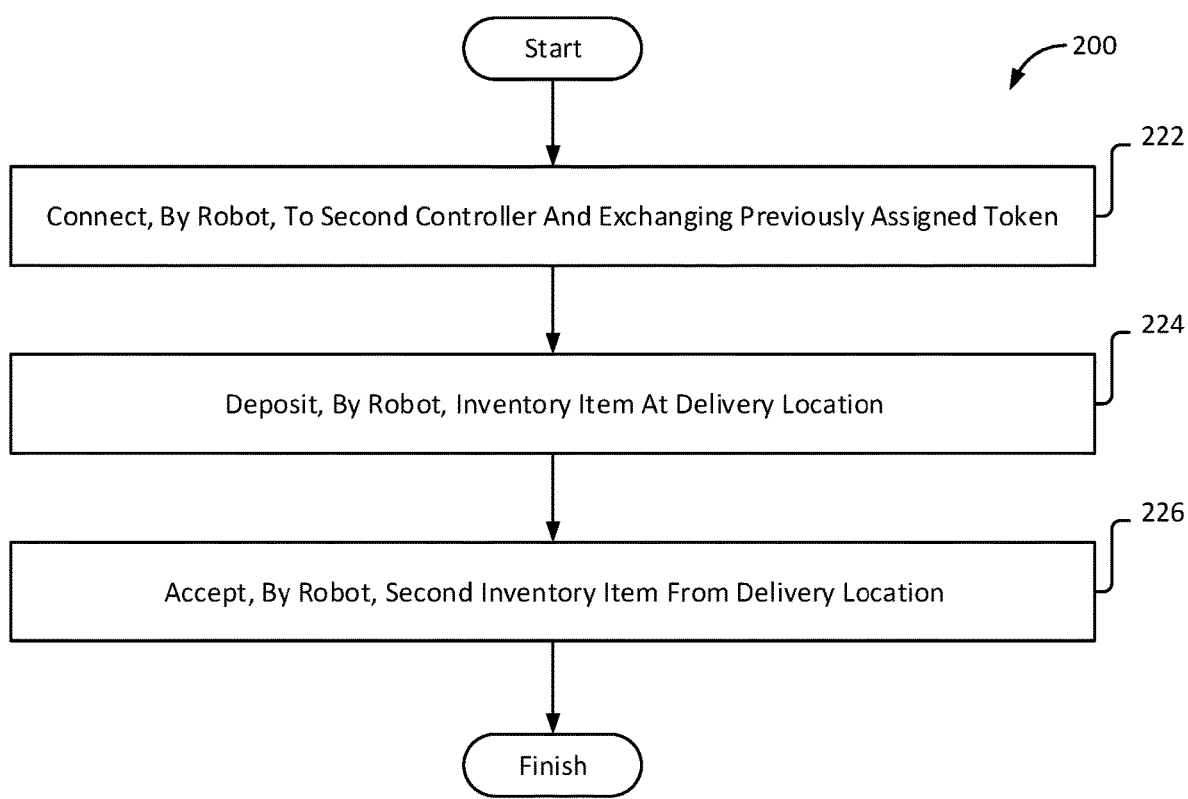

FIGS. 2A, 2B, 2C and/or 2D illustrate a method 200 for directing and controlling a supply chain control territory in an autonomous inventory management system, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, 2C and/or 2D and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

FIG. 2A illustrates method 200, in accordance with one or more implementations. In some cases, method 200 may include one or more aspects of system 100.

An operation 202 may include negotiating a dispatch routine between an autonomous robot (or autonomous storage unit) and an external control system, where the autonomous robot is configured to transport at least one inventory item. In some embodiments, the external control system may also be referred to as a destination territory controller or a host territory controller, and a master territory controller may assist in said negotiations. Operation 202 may be performed by one or more hardware processors configured by machine-readable instructions including a module that is the same as or similar to routine negotiating module 108, in accordance with one or more implementations.

In some cases, an operation 204 may include assigning a token to the robot and the external control system. The token may provide an identification signal between the robot and the external control system. Operation 204 may be performed by one or more hardware processors configured by machine-readable instructions including a module that is the same as or similar to robot assignment module 110, in accordance with one or more implementations.

An operation 206 may include registering an autonomous robot departure event with one or more of the external control system and/or a control system (i.e., master territory controller). Operation 206 may be performed by one or more hardware processors configured by machine-readable instructions including a module that is the same as or similar to robot departure event registering module 112, in accordance with one or more implementations.

An operation 208 may include providing a secure connection between the robot and a first transport controller. In some cases, the first transport controller may be associated with or assigned to a first transportation system. Operation 208 may be performed by one or more hardware processors configured by machine-readable instructions including a module that is the same as or similar to connection providing module 114, in accordance with one or more implementations.

An operation 210 may include authenticating the connection between the robot and the first transport controller. In some embodiments, authenticating the connection may be based at least in part on an authentication handshake. Operation 210 may be performed by one or more hardware processors configured by machine-readable instructions including a module that is the same as or similar to connection authentication module 116, in accordance with one or more implementations.

An operation 212 may include giving, by the first transport controller, the robot permission to access a specified geographic territory (e.g., host control territory) at a delivery location. In some examples, the external control system may be located at or near the specified geographic territory at the delivery location. Operation 212 may be performed by one or more hardware processors configured by machine-readable instructions including a module that is the same as or similar to robot permission giving module 118, in accordance with one or more implementations.

FIG. 2B illustrates method 200, in accordance with one or more implementations. In some cases, method 200 may include one or more aspects of system 100.

In some cases, an operation 214 may include providing, by the first transport controller, a transport route to the robot. The transport route may include information about permitted parking areas, ways to ingress and egress, etc. Operation 214 may be performed by one or more hardware processors configured by machine-readable instructions including a module that is the same as or similar to transport route providing module 120, in accordance with one or more implementations.

In some cases, an operation 216 may include sending, by the first transport controller, a signal to the robot when it arrives at a destination. Operation 216 may be performed by one or more hardware processors configured by machine-readable instructions including a module that is the same as or similar to signal sending module 124, in accordance with one or more implementations.

An operation 218 may include connecting, by the robot, to a second controller, wherein the second controller is assigned to the destination. In some cases, the second controller may be an example of a host territory controller, or the external control system as described in relation to FIGS. 1 and 2A. Operation 218 may be performed by one or more hardware processors configured by machine-readable instructions including a module that is the same as or similar to transport controller connection module 126, in accordance with one or more implementations.

In some cases, an operation 220 may include providing by one or more of the first transport controller and the second controller (i.e., host controller or external control system), driving paths and building access instructions to the robot. In some examples, building access instructions may include access keys to entry doors, access keys or instructions for elevators, escalators, etc. Operation 220 may be performed by one or more hardware processors configured by machine-readable instructions including a module that is the same as or similar to access instruction driving module 122, in accordance with one or more implementations.

FIG. 2C illustrates method 200, in accordance with one or more implementations.

An operation 222 may include connecting, by the robot, to the second controller. Operation 222 may further include exchanging the previously assigned token between the robot and the second controller, wherein the token is assigned by the master controller. Operation 222 may be performed by one or more hardware processors configured by machine-readable instructions including a module that is the same as or similar to token exchange module 128, in accordance with one or more implementations.

In some embodiments, an operation 224 may include depositing, by the robot, the inventory item at the delivery location. Operation 224 may be performed by one or more hardware processors configured by machine-readable instructions including a module that is the same as or similar to inventory item deposition module 130, in accordance with one or more implementations.

In some cases, an operation 226 may include accepting, by the robot, a second inventory item from the delivery location. Operation 226 may be performed by one or more hardware processors configured by machine-readable instructions including a module that is the same as or similar to inventory item accepting module 132, in accordance with one or more implementations.

Figure 2D:
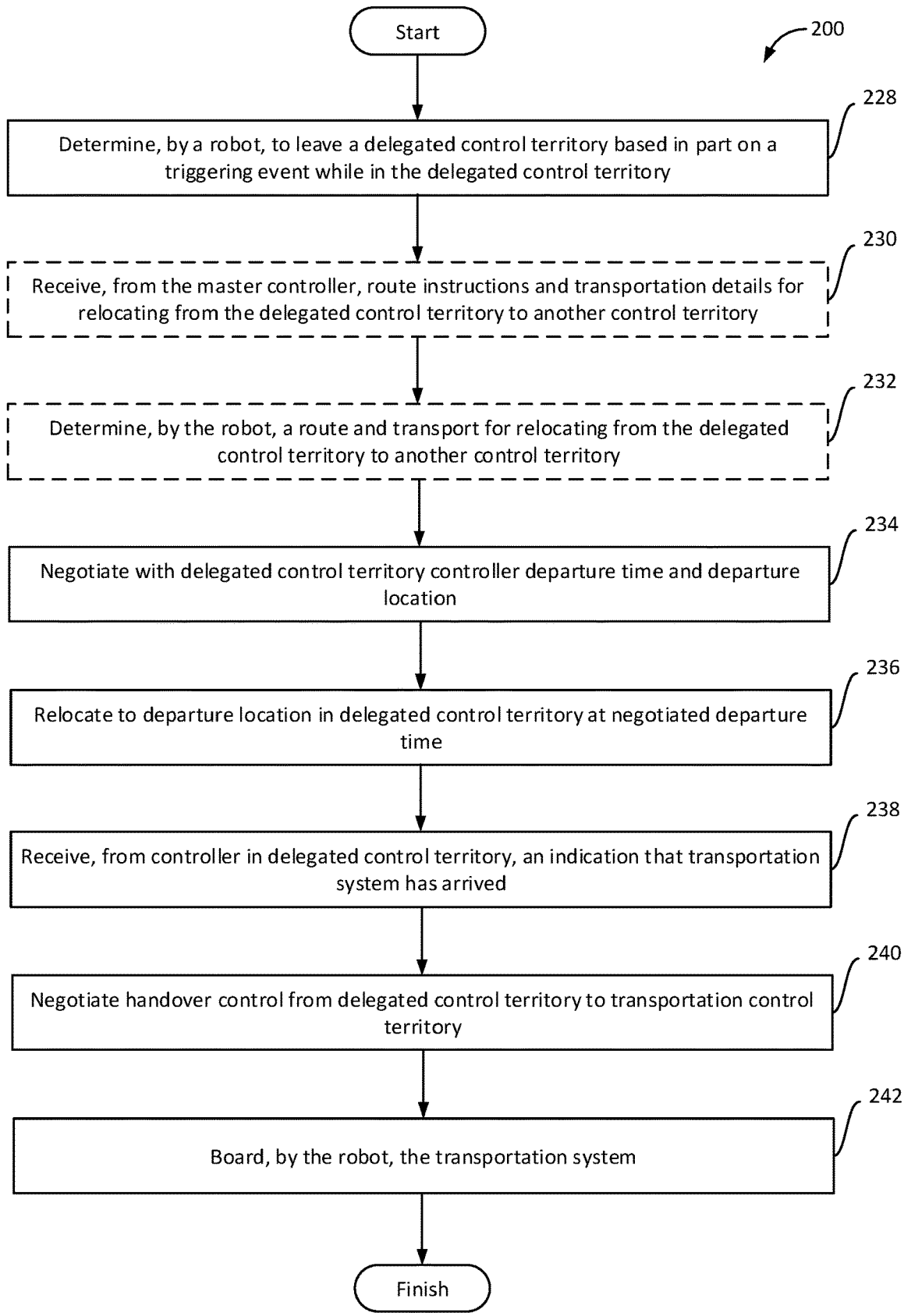

FIG. 2D illustrates method 200, in accordance with one or more implementations. In some cases, method 200 may include one or more aspects of system 100.

In some cases, an operation 228 may include determining, by a robot or autonomous storage unit, to leave a delegated or host control territory based in part on a triggering event while in the delegated control territory. In some examples, a triggering event may include the successful delivery of an inventory item to the host control territory. In other cases, a triggering event may include a recall order from a controller at the master control territory. In some examples, the recall order may be based on a business dispute between the master controller and the host controller, or a failed handshake between the autonomous storage unit and the host controller. Techniques for addressing and dealing with failed handshakes are further described above. In yet other cases, a triggering event may include an order to leave the host territory from the host controller.

In some cases, an operation 230 may include receiving, from the master controller, route instructions and transportation details for relocating from the delegated control territory to another control territory, such as the master control territory.

Alternatively, in some cases, an operation 232 may include, determining, by the robot, a route and transport for relocating from the delegated control territory to another control territory, such as the master control territory. It should be noted that the dashed boxes may be used to represent that only one of operation 230 or operation 232 may be executed in method 200.

In some cases, an operation 234 may include negotiating a departure time and/or departure location with the controller in the delegated control territory. In some examples, one of the autonomous storage unit or the master territory controller may be involved in the negotiations.

In some cases, an operation 236 may include relocating, by the robot, to the departure location in the delegated control territory at the negotiated departure time.

In some cases, an operation 238 may include receiving, from the controller in the delegated control territory, an indication that a transportation system has arrived. As previously described, the transportation system may include a transport controller. In other cases, operation 238 may include receiving, from the transport controller, an indication of an arrival of the transportation system.

In some cases, after the autonomous storage unit receives the indication of the arrival of the transportation system, the autonomous storage unit may be configured to negotiate handover control from the controller in the delegated control territory to the transport controller, as seen in operation 240.

In some cases, an operation 242 may include boarding, by the autonomous storage unit or robot, the transportation system.

Figure 3:
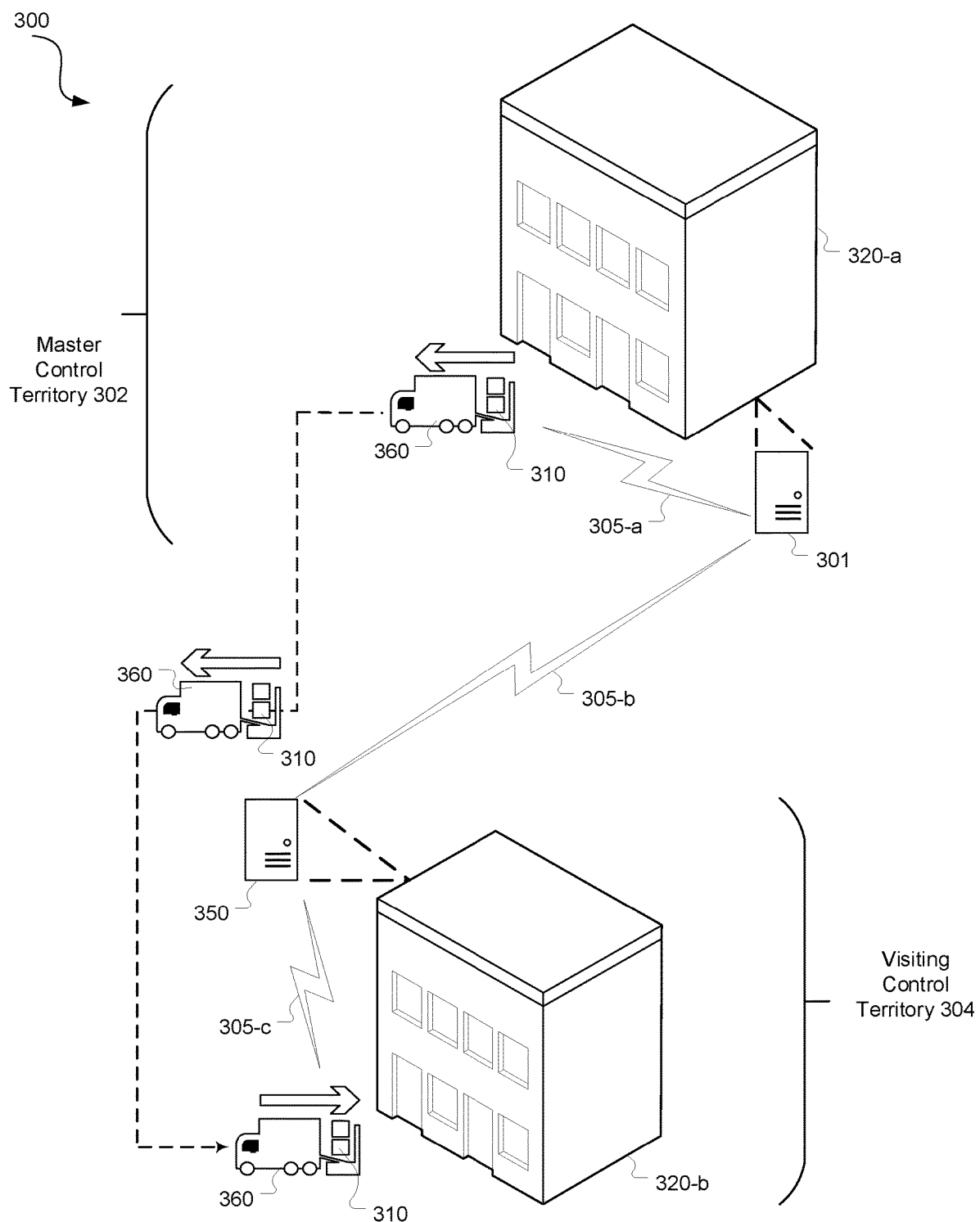
FIG. 3 illustrates a sample mobile inventory transport communication network in accordance with embodiments described herein.

FIG. 3 illustrates a sample mobile inventory transport communication network 300, according to an embodiment of the disclosure. The mobile inventory transport communication network may include a first central system 301, a first MITU 310, a second central system 350, and a transportation system 360. In some embodiments, the first central system 301 may be an example of a warehouse or inventory dispatch system located at a warehouse and may be responsible for managing inventory demands received from the second central control system 350. The first central system 301 may also be an example of or may include a master territory controller, like the one described in relation to FIGS. 1 and 2A-D. In some cases, first central system 301 may operate over or may be assigned to master control territory 302. In some cases, master control territory may encompass geographic location 320-a. Further, the second central system 350 may be an example of a retail system located at a retail location, such as a grocery store, a department store, shopping mall, etc., and may be an example of or may include a host territory controller, similar to the one described in relation to FIGS. 1 and 2A-D. In some cases, the host territory controller or second central system 350 may operate over visiting control territory 304. Further, visiting control territory may encompass geographic location 320-b.

In some cases, second central system 350 may be in communication with the first central system 301. Further, first central system 301 and/or second central system 350 may communicate schedule, routing, and unit demands for autonomous storage units or MITUs between different geographic sites.

The first central system 301 may be responsible for the cataloging and scheduling of all connected autonomous storage units or MITUs (e.g., MITU 310) that may be operating in the central systems communication network. The first central system 301 schedules the movements of the MITUs in response to demands at differing physical locations in the network. In some cases, first central system 301 may be in communication with one or more different central systems to respond to additional inventory demands outside the geographic region within which central system 301 operates. First central system 301 incorporates software and hardware to organize, schedule, and carry out the movements of the autonomous storage units or MITUs by communicating with the MITUs' local control devices. First central system 301 is also in communication with transportation systems that may be within the network. Such communication may be by Wi-Fi, cellular, Bluetooth, or any other communication means.

As an example, first central system 301 may receive an indication that a package or an inventory item needs to be delivered to the second geographic location 320-b. In some embodiments, one or more MITUs (including MITU 310) at the first location may be in communication with the first central system and may also receive a ping or notification of this indication. In some examples, MITUs may be aware and knowledgeable of the inventory they are holding, and in this example, MITU 310 may realize that it is already loaded with the inventory desired at the second geographic location, and thus, best suited to handle the particular inventory demand. In such cases, MITU 310 may notify the first central system that it has the inventory in possession, upon which MITU 310 or the first central system schedules transport of the MITU 310 to the second location 320-b on transportation system 360. In some cases, the central system 301 may schedule the transport of the MITU 310 via one or more waypoints (not shown) before the package is delivered to the second location.

In some circumstances, once the transportation system 360 receives the MITU 310 in the first geographic location 320-a, the MITU 310 may be in communication 305-a or 305-b with either of the central systems during its journey to the second geographic location 320-b. Additionally or alternatively, the transportation system 360 may be in communication with one or more of the central systems. In some cases, the MITU 310 and a transport controller assigned to transportation system 360 may perform an authentication handshake, as described above in relation to FIGS. 1 and 2A-D.

It should be noted that, transportation system 360 may be a variety of transportation systems including conveyors, elevators, or vehicles (e.g., automobiles, trucks, trains, aircrafts, boats, and/or ships). Transportation system 360 is primarily responsible for moving autonomous storage units or MITUs between different geographic points. For example, this may be accomplished by a conveyor system at a single geographic site which moves MITUs from one point to another, or it could be accomplished by loading MITUs into a vehicle and moving the MITUs to a second geographic region. Importantly, transportation system 360 and/or MITU 310 is in communication with one or more central systems (e.g., first central system 301, second central system 350, etc.), and the scheduling and movement performed by transport system 360 may be monitored by a central system in order to allow for autonomous movement of the MITUs. For example, first central system 301 may communicate scheduling information to transportation system 360 and the MITUs. Further, transportation system 360 may receive the MITUs that the first central system 301 has scheduled. Once transportation system 360 has received the autonomous storage unit, it transports the autonomous storage units to a second location. In some examples, such a location could be across a single warehouse. In some other examples, such a location could extend across a larger geographic area, such as a city, state, or even a country.

In some examples, once the MITU 310 is loaded on the transportation system, it may continue to remain in direct communication with at least the first central system 301, the second central system 350, or both. Alternatively, the MITU 310 may remain in direct communication with the first central system 301 until it reaches the second geographic site 320-b, following which it aborts communication with the first central system 301, and switches to communicating with the second central system 350. In some cases, prior to initiating communications with the second central system 350, the MITU 310 and second central system 350 may also perform an authentication handshake or exchange authentication tokens. In some embodiments, the authentication token may be provided by the controller in master control territory 302, as described above in relation to FIGS. 1 and 2A-D.

In some other examples, the MITU 310 may remain in communication with the one or more central systems via the transportation system 360. For instance, the autonomous storage unit or MITU 310 may communicate with the transportation system via one or more limited range communication techniques (e.g., Bluetooth or Near field Communications (NFC)), while the transportation system 360 may communicate with the central systems via one or more longer range techniques, such as cellular communications (e.g., 4G, 5G, etc.) or Wi-Fi.

In some examples, the MITU 310 may also utilize a variety of techniques for communicating with the central systems, including cellular technology and Wi-Fi. Additionally or alternatively, the MITU 310 or the transportation system 360 may comprise GPS tracking chips, allowing their locations to be tracked in real-time by the central systems, which may serve to alleviate issues arising from inadequate cellular coverage (i.e., dead zones), or when the MITU 310 and its components are turned off to conserve power. It should be noted that the MITU 310 is autonomous and may be aware of the inventory it is holding, delivery deadlines, control parameters for the inventory, such as temperature, humidity, vibration considerations, as well as the tasks it needs to complete at the second geographic site 320-*b*, prior to even leaving the first geographic site 320-*a*.

After authentication and verification of MITU 310, the second control system 350 may convey key site information to the MITU 310. Site information may include one or more of a site map of the area, as well as important parameters for the MITU 310 to obey, such as paths that MITU 310 is permitted to take while it is within visiting control territory 304. In some circumstances, the controller or central system 350 may not have access to a site map of the second geographic location 320-*b*. In such cases, MITU 310 may be configured to access site maps previously mapped out by other autonomous storage units that have visited control territory 304. As further explained in FIG. 6, MITUs or autonomous storage units, including MITU 310, may comprise one or more sensors, such as laser, radar, infrared sensors, optical sensors, etc. Utilizing these sensors, MITUs or autonomous storage units may be configured to generate 3D maps of areas they are navigating within. Furthermore, MITUs or autonomous storage units may upload generated 3D maps to a cloud computing platform utilizing deep learning or artificial intelligence algorithms, which may serve to enhance map accuracy. In some cases, the one or more sensors may be used in conjunction with data obtained from a GPS chip of the MITU 310. Additionally or alternatively, 3D map generation may be based on wireless signal triangulation data from wireless communication systems of the MITUs, and wireless transceivers at the visiting control territory 304. In some cases, the use of wireless signal triangulation data for 3D map generation may be feasible since the likelihood of the location of wireless transceivers changing over time may be relatively low.

In some examples, visiting control territory 304 may also include a holding area for autonomous storage units. In some cases, newly arrived autonomous storage units, such as MITU 310, may configured to wait at such holding areas while awaiting to be swapped out with depleted autonomous storage units already at the store. In some cases, the MITU 310 may wait in a holding area until a certain time (e.g., 9 PM, 10 PM, etc.) indicated by the visiting territory controller, after which it may be permitted to drive on predetermined paths or streets to get to its intended destination. In some embodiments, the MITU 310 may also receive information pertaining to recharging stations, battery swap out stations, power outlets, etc., at the second geographic location 320-*b* from the visiting territory controller. In some circumstances, MITUs or autonomous storage units may be configured to transfer power to other autonomous storage units, as further described in relation to FIG. 6. In such cases, MITUs or autonomous storage units may transmit a low power alert to one or more other MITUs in the vicinity based on determining that a power or charge level is below a threshold and negotiate a time and location for power transfer.

In some embodiments, the visiting territory controller or second central system 350 may continuously direct MITUs, including MITU 310, within visiting control territory 304. After arriving in the visiting control territory, MITU 310 may be directed or controlled, like a remote controlled (RC) car, by the visiting territory controller or an operator (e.g., human or machine). It should be noted that, MITU 310 may continue operating one or more its sub-components, including camera, QR code or RFID tag readers, as well as those used for navigation, sensing, communication, etc., while being controlled by the visiting territory controller or operator. In some examples, the MITU 310 may also be operationally configured to turn off some of its sub-components, for instance, to conserve power. Furthermore, once outside the visiting control territory, the MITU 310 may revert to a previous state or configuration, for instance, a state or configuration prior to arriving at the visiting control territory. In other cases, the visiting territory controller may back off from a majority of the remote control of the MITU 310 (i.e., reinstate some level of autonomy to the MITU) and instruct it revert to a previous state or configuration. As an example, the visiting territory controller may direct and control the movement of MITUs or autonomous storage units in certain areas of the visiting control territory, for instance, when they are in the holding area, or in the inventory storage area of the retail store. In such cases, upon granting permission to exit the holding area or inventory storage area, the visiting territory controller may reinstate autonomous functionality of the MITU 310, allowing it to perform tasks or respond to inventory demands, autonomously, at the retail store.

It should be noted that there are two kinds of control territories a robot or autonomous storage unit must be aware of. One being the control territory of its owner, also referred to as the master control territory. The second being the host or visiting control territory, which may be the control territory of the location that the robot is temporarily visiting, such as a transport mechanism, store, private residence, and/or public space. When the robot is in the host or visiting control territory, it may be configured to manage its responsibilities to both its master and host controllers. In one example, if a supplier (i.e., master controller) wishes to recall an autonomous storage unit outside the master control territory, the autonomous storage unit may be configured to leave the host territory and return to either its master control territory or another territory identified by the master controller. In other words, regardless of the instructions or tasks assigned by the visiting territory controller, the master controller always takes precedence. In such cases, the autonomous storage unit may essentially ignore or override the tasks assigned by the visiting territory controller and prepare to leave the host territory.

In another example, the controller in the visiting control territory 304 may instruct the autonomous storage unit or robot to leave its territory. In such cases, the autonomous storage unit or robot may relocate to the transit area or dispatch location in the visiting control territory and wait for the next available transportation system to return to its master control territory.

Thus, as shown, one or more central systems may choreograph the movement of one or more autonomous storage units or MITUs between geographic areas (e.g., master control territory 302, visiting control territory 304) that each central system is responsible for. This creates an interconnected network of central systems that facilitates organized movement of autonomous storage units or MITU's between multiple geographic locations, while responding to the demands of multiple systems.

Figure 4:
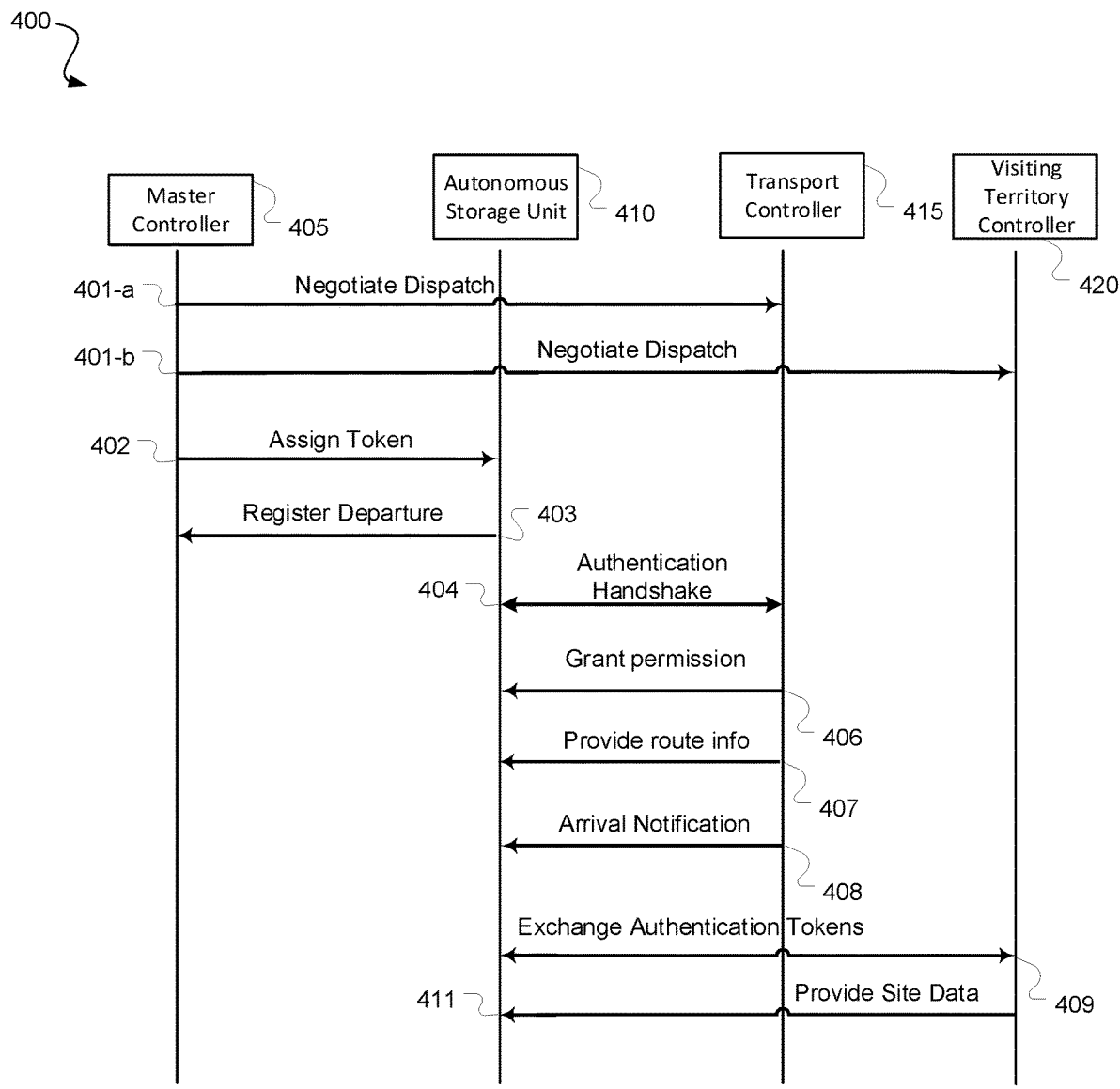
FIG. 4 illustrates a process flow for a sample mobile inventory transport communication network, in accordance with embodiments described herein.

FIG. 4 illustrates an example of a process flow 400 that supports directing and controlling a supply chain control territory in an autonomous inventory management system in accordance with one or more aspects of the present disclosure. In some examples, process flow 400 may be implemented by one or more of a master controller 405, an autonomous storage unit 410, a transport controller 415, and a visiting territory controller 420, which may be examples of similar devices or systems described in relation to FIGS. 1-3.

In some cases, the master controller 405 may negotiate dispatch of autonomous storage unit 410 with transport controller 415 at step 401-*a*. Transport controller 415 may be associated with a transportation system (not shown), as described in FIG. 3. At step 401-*b*, the master controller 405 may also negotiate dispatch of the autonomous storage unit 410 with the visiting territory controller 420. In some embodiments, the dispatch negotiation may be in response to a replenishment request, for one or more inventory items, received from the visiting territory controller 420. In some cases, the master controller 405 may also assign an authentication token to the visiting territory controller 420 during dispatch negotiation, which may be used to authenticate and verify the autonomous storage unit 410.

In some cases, at step 402, the master controller 405 may assign an authentication token to the autonomous storage unit 410, which may be the same as the authentication token assigned to the visiting territory controller at 401-*b*.

At step 403, the autonomous storage unit 410 may prepare to depart its dispatch point in the master control territory. In some embodiments, the autonomous storage unit may also register its departure with the master controller 405 at step 403. At step 404, the autonomous storage unit 410 may perform an authentication handshake with the transport controller 415. For instance, the autonomous storage unit 410 may wirelessly connect to the transport controller 415 using access information provided by the master controller in order to complete the authentication handshake. Additionally or alternatively, the authentication handshake may also comprise an exchange of a security key, password, or authentication between the autonomous storage unit 410 and the transport controller 415. In some examples, the security key, password, or authentication token may be assigned by the master controller 405, and may be known to both the autonomous storage unit 410 and the transport controller 415. In some cases, the authentication token may be different from the authentication token assigned to the visiting territory controller.

After a successful authentication handshake, the transport controller may grant permission for the autonomous storage unit 410 to board the transportation system at step 406. In some embodiments, the transport controller may also indicate, to the autonomous storage unit, a parking spot on the transportation system, recharge points or power outlets, driving paths when on the transportation system, ways to ingress and egress, etc.

At step 407, the transport controller may provide route information to the autonomous storage unit, including intermediate waypoints (if any), estimated arrival time, traffic information, etc. In some embodiments, the autonomous storage unit 410 may remain in communication with one or more of the transport controller 415 and the master controller during its journey to the visiting territory.

Upon arrival at the visiting territory, the transport controller 415 may transmit a signal (e.g., wired or wirelessly) to the autonomous storage unit 410. After receiving the arrival notification, at step 408, the autonomous storage unit 410 may disembark the transportation system. In some embodiments, the autonomous storage unit 410 may connect to a wireless network in the visiting territory and exchange the authentication token previously received from the master controller 405 with the visiting territory controller 420 at step 409. In some examples, the visiting territory controller 420 may verify the identity of the autonomous storage unit 410 after comparing the authentication token received from the autonomous storage unit 410 with the authentication token received from the master controller during dispatch negotiations at step 401-*b*.

In some circumstances, the authentication handshake between the autonomous storage unit and the visiting territory controller 420 may fail. In such cases, the transport controller 415 may be configured to assist in handover control of the autonomous storage unit 415 from the transport controller 415 to the visiting territory controller. In one example, the transport controller 415 may receive an indication of a failed authentication from the robot and may act as a relay for information (e.g., authentication tokens) exchanged between the robot and the visiting territory controller 420. In other cases, if multiple robots are disembarking the transportation system at the visiting territory, the autonomous storage unit 410 may piggyback its authentication token on communications between another robot and the visiting territory controller 420. In yet other cases, the autonomous storage unit 415 may be configured to remain on the transportation system and send a failed authentication message to the master controller 405 to resolve the problem. In some examples, the master controller may direct the autonomous storage unit 410 to return to the master control territory. Alternatively, the master controller may redirect the robot to a new destination or control territory, or the master controller may instruct the robot to reattempt the authentication handshake using the same or a different authentication token. In some cases, the master controller 405 may transmit a new authentication token to the autonomous storage unit 410 and visiting territory controller upon recognizing a failed handshake.

At step 411, the visiting territory controller 420 may provide site data or site maps to the autonomous storage unit 410, including paths for the robot to take when navigating around the visiting territory, holding areas, recharge locations, departure or dispatch locations, etc. In some cases, site data may also include access keys to access doors, elevators, security gates, escalators, etc. In some cases, autonomous storage unit 410 may comprise a wireless communication system, NFC system, Bluetooth or Bluetooth Low Energy (BLE) communication system, etc., which may allow it to communicate with wireless transceivers, NFC transceivers, and/or Bluetooth transceivers in the visiting territory, further described in relation to FIGS. 6 and 7 below.

Figure 5:
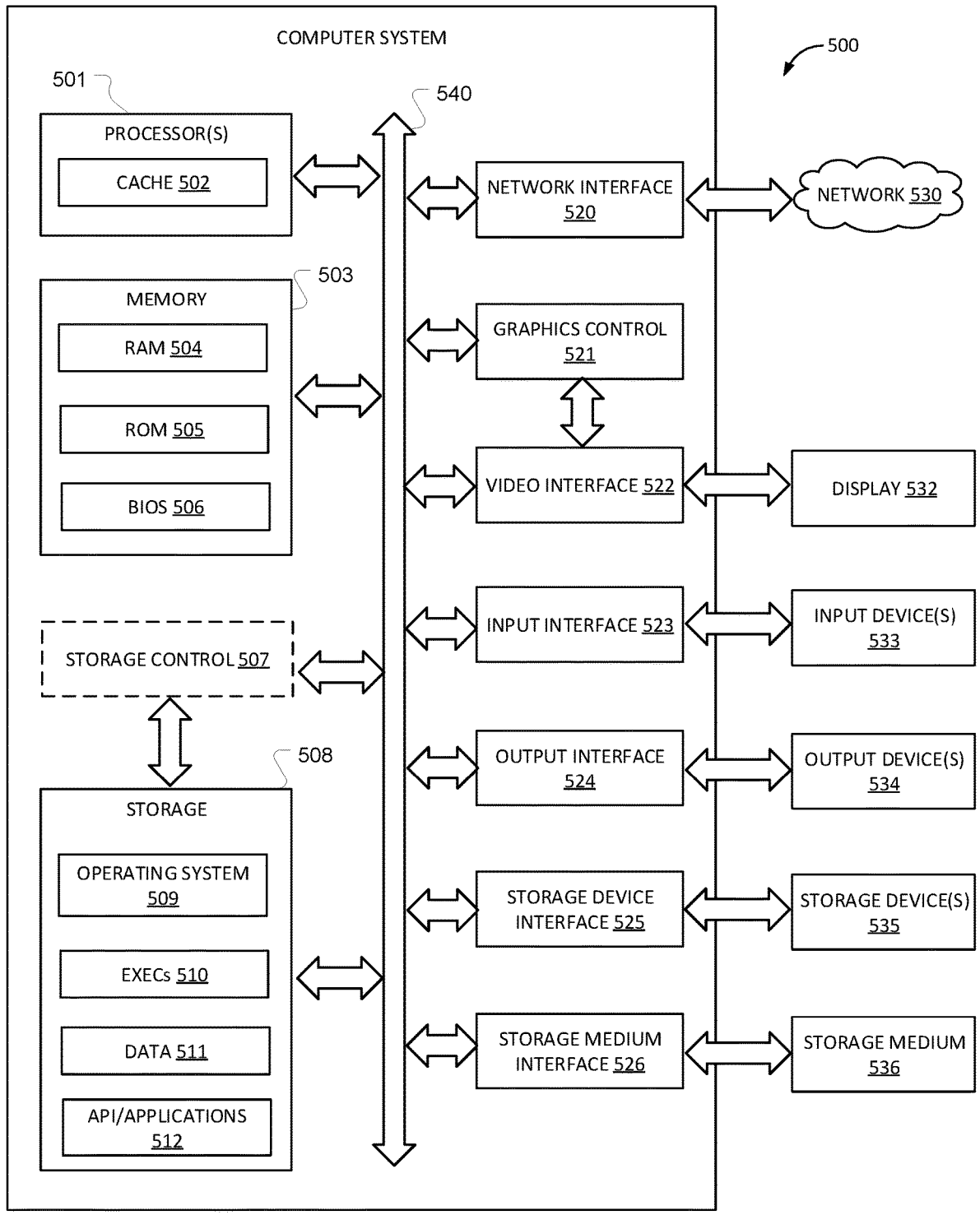
FIG. 5 illustrates a computer and system platform configured for implementing one or more aspects of the present disclosure.

Referring to FIG. 5, it is a block diagram depicting an exemplary machine that includes a computer system 500 within which a set of instructions can execute for causing a device to perform or execute any one or more of the aspects and/or methodologies of the present disclosure. The components in FIG. 5 are examples only and do not limit the scope of use or functionality of any hardware, software, embedded logic component, or a combination of two or more such components implementing particular embodiments.

Computer system 500 may include a processor 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer readable instructions. Computer system 500 may provide functionality for the components depicted in FIGS. 1-4 and 6-7 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random-access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, EXECS 510 (executables), data 511, API applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition, or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

FIG. 6 illustrates an example of a Mobile Inventory Transport Unit (MITU) 600. In some cases, MITU 600 may also be referred to as a robot, smart rack robot, an autonomous smart rack robot, an autonomous storage unit, or an autonomous inventory storage unit. In some cases, MITU 600 may comprise a robot portion, including at least drive device 601, balance device 602, control device 610, navigation device 620, sensing device 630, and power device 640. Further, the MITU 600 may comprise a structural portion including at least housing 605 and inventory storage device 650. In some examples, the robot portion of the MITU 600 may be shaped like a cube, a cuboid, a cylinder, or any other shape, and may comprise one or more wheels and balance devices on its lower portion. In some other cases, the robot portion may be surrounded by, or substantially surrounded by the housing device 605. Further, the robot portion may be in electronic communication (either wired or wireless) with the housing device 605 and/or the inventory storage device 650.

In some examples, housing 605 encloses the electrical and physical components of contained within MITU 600. Housing device 605 is physically coupled to an inventory storage device and serves as the base for the inventory storage device. Importantly, the physical coupling conjoins the inventory storage device and the housing device 605 such that the two devices function as one physical object. In some cases, the housing device 605 and the inventory storage device may be joined via screws, nuts and bolts, nails, any other type of fastener, or even welding.

Inventory Storage

MITU 600 includes inventory storage device 650. Inventory storage device 650 stores physical items, such as inventory, that MITU 600 moves from at least a first physical location to a second physical location, or even multiple locations. Inventory storage device 650 may be a variety of storage devices including shelves, buckets, augers, and arms. Additionally or alternatively, the inventory storage device 650 may also comprise climate controlled units for handling and transporting items (e.g., pharmaceuticals, vaccines, blood for blood banks or blood donation drives, perishable goods, beverages, etc.) that need to be kept at a certain goal temperature, further described in relation to FIG. 7. As shown, inventory storage device may be physically coupled to housing device 605. In other words, the physical coupling of housing device 605 and inventory storage device 650 creates one physical object. As shown, in some examples, the housing device 605 and inventory storage device 650 may be in the form of a cube or a cuboid, and may be joined together via welding, or using one or more fasteners. In some other cases, a rod or pole (not shown) may pass through the center of the housing device 605, where the rod is affixed to the upper portion of the housing device 605. Further, the inventory storage device 650 may be installed on or around the rod, such that the rod passes through one or more shelves of the inventory storage device (i.e., shelves are perpendicular to the rod).

As indicated above, the inventory storage device 650 coupled with the robot portion of the MITU 600 may collectively be referred to as a smart rack robot. In some instances, upon loading, the inventory storage device may be operationally configured to determine information pertaining to the inventory it is holding. For instance, the smart rack robot may determine one or more of a name, a description, a quantity, a bar code or stock keeping unit (SKU), a price, a weight, a dimension, and a location within the inventory storage device for one or more items held by the storage device. In some embodiments, the visiting (or host) territory controller (not shown), may be configured to relay prices for one or more inventory items held by MITU 600 to the MITU 600. Further, the MITU 600 may be operationally configured to display said prices on display 660 to a customer or user at the retail store, further described below.

In some embodiments, the inventory storage device 605 may receive power from power device 640 of the robot portion of the MITU 600, for instance, to power lights or a display mounted on the inventory storage device. Additionally, or alternatively, the inventory storage device 605 may also comprise a power source (not shown), which may be used as a backup for power device 640. In some cases, the power may be transferred via cabling running through the center of the robot portion and the housing device 605. For instance, one or more power cables may be installed around or inside the center rod (or pole) of the MITU 600. In one example, the robot portion of the MITU 600 may be configured to rotate inside the housing device 605, for instance, when MITU 600 is turning at a corner. In such cases, a slip ring may be used to supply power and data to from the power device 640 to the inventory storage device 605. Slip rings may be examples of electromechanical devices that allow the transmission of power and electrical signals from a rotating object (e.g., robot portion) to a stationary structure (e.g., inventory storage device).

In some other cases, the power may be transferred wirelessly (e.g., resonant inductive coupling) or via an NFC connection. For instance, the housing device 605 and the inventory storage device 650 may comprise NFC antennas that are coupled and spaced a distance (e.g., 1 mm, 2 mm, 1 cm, 2 cm, etc.) apart, allowing bidirectional transfer of power and data. The NFC antennas may be microstrip patch antennas (e.g., square, rectangle, circular, elliptical, or any other continuous shape) fabricated on the surface of a printed circuit board (PCB). Further, the substrate of the PCB may be composed of a dielectric material, such as Gallium Nitride (GaN), Gallium Arsenide (GaAs), epoxy resin, Teflon, ceramic, etc. In some cases, the NFC antennas may facilitate communication between the MITU or autonomous storage unit with other NFC capable devices. In one example, an elevator in a visiting control territory may comprise an NFC reader, which may allow users to control the elevator (i.e., call the elevator, open/close doors, input floor number, etc.) via NFC enabled mobile devices (e.g., smartphones or tablets). In some cases, MITUs or autonomous storage units may also be configured to ride elevators implementing such NFC technology. It should be noted that, in some examples, the MITU 600 may be provided an access key, an NFC tag, or a RFID tag to get initial access to the elevator. In other cases, the MITU 600 may only be granted access to certain floors corresponding to the drop off locations of its inventory or packages.

In some embodiments, the inventory storage device 650 may comprise one or more visual indicators, such as a rows of lights 611 (e.g., Light Emitting Diode (LED) lights). Further, the robot portion or the inventory storage device 650 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy.

Additionally, or alternatively, the visual indicator may comprise a display 660, which may be mounted on the inventory storage device 650, for instance, when the MITU is configured to be deployed in a retail setting. In some cases, the display 660 may be an example of a Liquid Crystal Display (LCD), a LED display, or another High Definition (HD) display. In such cases, the display 660 may be used to display a price, or other key product information such as product specification, nutrition information and/or ingredients (if applicable), or even a product image. In some examples, the inventory storage device 650 may comprise one or more buttons adjacent (e.g., above or below) a slot or shelf on which a product is placed, and a user may view product information on the attached display by clicking the said buttons. In some embodiments, the inventory storage device may also comprise one or more cameras, Radio Frequency Identification (RFID) readers, or weigh scales for tracking inventory. In one example, a camera mounted on the inventory storage device 650 may capture images or video feeds, based on which the MITU may determine information pertaining to an item (e.g., description, quantity, etc.) that was taken off a shelf. In other cases, a RFID reader may scan RFID tags attached to items or products remaining on the shelf in order to determine the items (e.g., description, quantity, etc.) that were taken off the shelf. In yet other cases, a built-in weighing scale may be used to correlate the weight of the removed items to the weights and locations of different items initially stored in the inventory storage device 650. It should be noted that the inventory storage device may incorporate one or more of the inventory tracking techniques described above.

Upon detecting the removal of one or more items from its shelves, the inventory storage device 650 may be configured to update its inventory level and relay that information to a retail store based system or to the manufacturer (e.g., if the retailer utilizes pull-based replenishment methods). In other cases, the inventory storage device may also be configured to alert or advise the retail store, for instance, if a customer incorrectly placed an item on its shelves. In yet other cases, the inventory storage device may be configured to issue alerts when it realizes that it is being loaded or unloaded at a time outside a scheduled or authorized time period. In some cases, the inventory storage device may flash blinking red lights or sound an audible alarm to a user of the MITU in response to such events.

In some embodiments, the inventory storage device of MITU 600 may comprise a lockable cabinet for storing big-ticket or high-ticket items, or items needing age verification, such as alcohol or cigarettes. In some cases, the MITU 600 may be configured to lock such inventory items behind the cabinet door(s) and control the opening/closing of said doors. In some cases, the cabinet door(s) may be transparent, thus allowing a customer to view the items for sale. In other cases, the MITU 600 may display a list of its inventory items on the visual display. In one example, if the MITU 600 is carrying alcohol, a user or customer may be required to show proof of age before the cabinet doors may be unlocked. In some cases, the MITU 600 may confirm the user's age via a combination of an ID scanner on the MITU and visual identification (e.g., facial recognition to confirm that the picture on the ID matches the user in front of the MITU).

Similarly, the lockable cabinet of the MITU 600 may also serve to optimize user experience at retail stores that allow customers to order goods online and pick them up at the store. In some cases, MITUs may comprise a plurality of lockers for storing such goods for one or more users, and users may be able to pick up their goods after confirming their identity at the MITU. In some examples, depleted MITUs may be periodically replaced based on instructions from a master controller or central system.

Drive

In some embodiments, the MITU is configured to account for various anomalies in the environment, such as raised surfaces or other varying terrain. In those cases, the MITU may be adapted to maneuver in these environments as well. MITU 600 includes drive device 601. Drive device 601 supplies the method of moving MITU 600. Drive device 601 may be a variety of locomotion devices including one or more wheels, treads, or actuators. In some cases, drive device 601 may comprise four wheels, one on each edge or side of MITU 600. In some cases, one or more wheels may be raised up while the MITU 600 is traveling in a straight line. In some other cases, all four wheels may be in contact with the ground, for instance, to turn the MITU 600. In some embodiments, drive device 601 and control device 610 may control the pace at which the wheels rotate (i.e., same or different pace), allowing the MITU 600 to turn or take corners. In some examples, the MITU 600 may receive terrain information while navigating through a particular area from one or more other MITUs that have previously navigated through the same area, or alternatively, from a control system of a mobile inventory transport communication network. In other cases, the MITU 600 may identify variations in terrain in real-time, for example, via one or more sensors. The sensors may be selected from a group consisting of an accelerometer, a gyroscope, or any other sensors configured to register rapid variations in movement or spring displacement, which may indicate the presence of rough terrain. In other cases, the MITU 600 may support an "off-road" mode, which may include one or more of changing its suspension profile, spring dampening effects, and ground clearance.

In some examples, MITU 600 may be bipedal (2), quadrupedal (4), or hexapedal (6), and drive device 601 may comprise one or more legs. Further, in some embodiments, MITU 600 may be capable of climbing stairs and/or navigating over sidewalks, which may be facilitated via the use of one or more cliff sensors installed on the underside of the MITU 600 or housing 605. In some other examples, MITU 600 may comprise a combination of wheels and legs and may be referred to as a hybrid transport unit. In yet other examples, drive device 601 may enable MITU 600 to navigate by slithering (i.e., in a snake like motion). In some aspects, drive device 601 is the primary method for physically moving MITU 600 from a start point to an end point.

Balance

In some cases, MITU 600 may include balance device 602. In some cases, balance device 602 may supply weight distribution of MITU 600 and may offset the force exerted by drive device 601 when MITU 600 is either stationary or moving. In some examples, balance device 602 may incorporate a variety of balance devices including one or more wheels, one or more bearings, or a fixed apparatus. For instance, balance device 602 may be composed of two wheels, one in the front and one in the rear of the MITU 600. In some other cases, balance device 602 may comprise one or more sensors, such as a gyroscope, an accelerometer, or a combination. A gyroscope may be an example of a device used for measuring or maintaining orientation and/or angular velocity, and the orientation of the MITU 600 may be adjusted based in part on the output readings from the gyroscope. In some examples, a gyroscope or an accelerometer may be used in combination with a controller (e.g., a proportional-integral-derivative (PID) controller) to balance the MITU 600. In one example, MITU 600 or a control device 610 of MITU 600 may gather readings from one or more sensors (e.g., accelerometer or gyroscope) installed within the MITU. Further, MITU 600 may calculate an altitude (i.e., angle with respect to the horizon, or a surface the MITU is traveling over), compare the angle with a target angle (e.g., 0 degrees if it's a flat surface, 15 degrees, 30 degrees, etc., if it's an incline), and calculate a difference between the two angles. Based on the difference between the angles, the drive device 601 may cause the MITU 600 to accelerate (or decelerate) until the difference between the angles is reduced to zero to preserve the balance.

Navigation, Sensing & Control

In some cases, the housing 605 may comprise one or more slots or openings for a sensor or sensing device 630. Further, the sensing device 630 (e.g., camera, or object detection device) may be installed such that it is aligned or substantially aligned with the one or more slots or openings. In some examples, there may be a slot or opening on each side or edge of the housing, allowing a 360-degree field of view at the MITU 600. In some embodiments, one or more edges of the housing 605 (e.g., front edge) may comprise an additional opening behind which a one or more other sensors (e.g., a LIDAR sensor) may be installed.

MITU 600 includes control device 610. Control device 610 locally controls the autonomous movement of MUTU 600 in response to multiple inputs. Control Device 610 includes a control unit which incorporates software and hardware into autonomous control of MITU 600. Control device 610 may be in communication with multiple other systems including one or more central systems (e.g., warehouse system, retail system), transportation systems (e.g., vehicles or transportation providers utilized to relocate the MITU from one geographic site to another), or even other MITUs or smart rack robots, to control the movement of MITU 600 in response to these systems' requirements. In some cases, such communication may be facilitated via Wi-Fi, Bluetooth, Near Field Communication (NFC), Cellular, Radio, or any other means.

Control device 600 is also in communication with sensing device 630 and respond to physical objects that sensing device 630 may detect. Control device 610 is also in communication with drive device 601 to control the movement of MITU 600. In some cases, control device 610 may include an analog to digital (ADC) converter to convert analog readings (or signals) from the various sensors into digital signals and may also incorporate a feedback loop. As an example, MITU 600 may be configured to travel in a straight-line while being surrounded on both sides by other objects (e.g., robots, shelves, etc.), a typical scenario inside a warehouse. Further, the control device 610 may receive information pertaining to the objects from the sensing device 630. In some cases, the sensing device 630 may comprise one or more infrared object detectors that can measure the distance from the left and right sides of the MITU 600 to the objects. The sensing device 630 may create a continuous analog voltage that depends inversely on the distance to the objects. In some cases, the analog voltage may be passed on to the ADC converter in the control device 610, following which the control device 610 computes an error (e.g., a difference between readings from the left and right sides of the robot), and adjusts the inputs to the drive device 601 until the error is reduced to zero.

MITU 600 includes navigation device 620. Navigation device 620 determines the physical position of MITU 600 and communicates the location data to the control device 610. Navigation device 620 may incorporate a variety of methods of location identification including one or more of Global Positioning System (GPS), 802.11 Wi-Fi, Cellular, Quick Response (QR) codes, barcodes, Radio-Frequency Identification (RFID), Near Field Communication (NFC), magnetic positioning, Ultra-wide band (UWB), ultrasound, etc. While GPS and cellular methods of location identification suffice for outdoor applications, they lack accuracy and reliability indoors, especially in large multistory buildings (e.g., warehouses, hotels, office buildings), airports, parking garages, and underground locations. In such cases, alternate techniques and devices may be utilized to provide indoor position, which may range from Wi-Fi and Bluetooth antennas to purpose-built installations with relays and beacons.

In some other cases, QR codes or barcodes may be affixed to known locations inside the warehouse or indoor structure navigated by the MITU 600. For instance, a MITU 600 navigating within a warehouse or building may be able to determine its location based on scanning and decoding the QR codes. In some cases, the MITU 600 may be aware of the QR code associated with an end point within the warehouse. In such cases, the MITU may navigate (e.g., in straight lines between QR codes), until the end point is reached. In one example, localization of the MITU 600 may be determined from odometry readings gathered from the drive device 601. For instance, the control device 610 or the drive device 601 may maintain an accurate count of the number of times the drive device 601 or a motor turning the wheels has turned. Further, since the diameter of the wheel and the starting point is known, the localization of the MITU 600 may be determined by calculating straight line distances between two adjacent points. As an example, if MITU 600 is navigating between a starting point A and an ending point F, via intermediate points B, C, D, and E, the control device 610 or drive device 601 may compute the number of times the drive device 601 needs to turn in order to ensure MITU 600 reaches point B, recalculates the number of times the drive device 601 needs to turn to reach point C (i.e., once point B is reached), and so on. In some cases, the MITU 600 may determine it has reached an intermediate point based on scanning a QR code at that point. In some examples, the QR codes may be affixed to the floor, on the ceiling, or another known location. Further, the QR codes may be visible (e.g., printer ink) or invisible (e.g., UV ink, infrared ink, etc.) to the naked human eye. In some cases, a camera, or QR code or barcode reader on the MITU 600 may be configured to scan and identify codes painted in ink invisible to the human eye. Additionally, or alternatively, the MITU 600 may comprise one or more infrared LEDs for illuminating targets, which can then be identified by the camera or QR code reader. It should be noted that this camera or barcode reader may be the same as, or in addition to the camera and barcode reader utilized by the inventory storage device 650, described above.

MITU 600 includes sensing device 630. Sensing device 630 responds to physical object present near MITU 600. Sensing device 630 may incorporate a variety of sensing methods, with the primary ones being visual or infrared cameras, although others including LIDAR, Radar, Laser, ultrasound (or ultrasonic) are also envisioned. Sensing device 630 communicates the physical object data to control device 610. Single or multiple camera configurations may be incorporated in order to provide stereo camera implementations to extract other data such as depth information. In some cases, the sensing device 630 may generate a 3D virtual rendition of the warehouse or building to assist MITU 600 during navigation. In some circumstances, the MITU 600 may combine the 3D virtual model of its navigating environment with real data, such as, but not limited to, physical building measurements, real-time acquired robot's position (i.e., based on rotation of wheels, QR codes, etc.), and data acquired from laser scanning to further enhance and visualize object detection for navigation. In some other cases, the sensing device 630 may deploy a technology, referred to as Simultaneous Location and Mapping (SLAM), where data from multiple sensors may be fused together to enable the MITU 600 to locate itself in a predetermined map without the use of fixed markers (e.g., QR codes, beacons, RFID tags, etc.). It should be noted that while SLAM improves navigation flexibility as compared to QR codes, SLAM may be more difficult or costly to implement.

Power

MITU 600 includes power device 640. Power device 640 supplies power to various components of MITU 600. Power Device 640 may be in electrical communication with drive device 601, control device 610, navigation device 620, sensing device 630, and inventory device 650. In some cases, power device 640 may be a battery, a fuel cell, a solar cell, to name a few non-limiting examples. In other embodiments, inductive charging or magnetic resonance charging (i.e., wireless power transfer) may be utilized, which may allow the robot or MITU 600 to charge while moving, such as when the robot is moving up and down aisleways, or when MITU 600 is loaded on the transport vehicle. In such cases, the MITU 600 may not need to dock to a charge station. In some cases, inductive charging plates may be installed in transport vehicles, warehouses, retail stores, etc., that the MITU 600 may park on for wireless transfer of power.

In some embodiments, MITUs or autonomous smart rack robots may behave not just as individual devices, but like a swarm of devices. For instance, the power device 640 of MITU 600 may be operationally configured to request power from or relay power to another MITU in its vicinity. In some examples, such power transfer may be achieved via inductive or resonant charging plates installed on MITUs, or via power connectors, such as male/female connectors or magnetically attachable power connectors located on the MITUs. In some other cases, the MITU 600 may request to use a power supply/outlet when it is running low on power, for instance, when another autonomous storage unit is already using the said power supply and has reached a sufficient level of charge. In some cases, a swarm of MITUs may be configured to tightly pack themselves, which serves to not only reduce floor space, but also the number of charge points needed. In some circumstances, floor mounted recharge plates may be installed on warehouse floors to propagate power to a large number of tightly packed MITUs.

FIG. 7 illustrates a side view of a MITU 700, in accordance with an alternate embodiment of the disclosure. In some cases, MITU 700 may be similar to or substantially similar to MITU 600 or the autonomous storage unit, as described with reference to FIGS. 1-6. Further, MITU 700 may include one or more of its sub-components. For instance, MITU 700 may comprise a robot portion, including at least a drive device, a balance device, a control device, a navigation device, a sensing device, and a power device. Further, the MITU 700 may comprise a structural portion including at least housing 705 and inventory storage device 750. As shown, in some examples, the robot portion of the MITU 700 may be shaped like a cube, a cuboid, a cylinder, or any other shape, and may comprise one or more wheels and balance devices on its lower portion. In some other cases, the robot portion may be surrounded by, or substantially surrounded by the housing 705. Further, the robot portion may be in electronic communication (either wired or wireless) with the housing device 705 and/or the inventory storage device 750. In some cases, inventory storage device 750 may also comprise one or more lights 711.

In some examples, the housing 705 may comprise one or more slots 707 on one or more sides/faces behind which a sensing device may be placed. In some cases, housing 705 may also comprise one or more manual interfaces 710. Further, the manual interface 710 may be a manual power switch through which a user can turn the autonomous storage unit or MITU on/off. In some other cases, the manual interface 710 may comprise one or more connectors (i.e., metallic, conductive, or magnetic), which may be used to dock the MITU to an external charging station. In some examples, the MITU 700 may be configured to navigate autonomously to a charging station when its battery or power level falls below a threshold (e.g., 10%, 20%, etc.).

As shown, in some embodiments, the housing portion of MITU 700 may comprise one or more detachable climate-controlled units 715-a, 715-b that can slide in and out of the MITU. In some examples, these climate-controlled units 715 may be electrically connected to the power device and may be capable of both heating and cooling. In other cases, the inventory storage device 750 of MITU 700 may also be climate controlled. In such cases, the MITU 700 may be capable of transporting hot and cold items (e.g., food, beverages, medicines or vaccines, etc.).

In one example, upon loading the climate-controlled units 715, the MITU 700 may be specified a certain goal temperature (or temperature range) for those items. In some embodiments, climate-controlled units 715 may comprise one or more electronic temperature sensors (not shown) for real-time monitoring. In such cases, the climate-controlled units or the control device of the autonomous storage unit may adjust the internal temperature to stay within the specified range based in part on readings obtained from the electronic temperature sensors. In some embodiments, climate-controlled units 715-a and 715-b may be specified different goal temperatures (e.g., one unit may be used for cooling, and the other for heating). In such cases, the MITU or autonomous storage unit may leverage its inbuilt power and control functionality to maintain the units at their respective desired goal temperatures. In yet other cases, the MITU 700 may not be specified a goal temperature for items placed in the climate-controlled units 715, and may identify an appropriate temperature based on determining information pertaining to the one or more loaded items (e.g., via SKUs, RFID tags, barcodes, etc. of the items).

In some cases, MITU 700 may be configured to communicate any deviations in temperature outside the specified range to a central system, such as central system 301 or master controller 405 or transport controller 415 or visiting territory controller 420, as described in relation to FIGS. 3 and 4, respectively. Upon receiving an alert from the autonomous storage unit or MITU 700, corrective actions may be implemented by one or more of the MITU 700 or the central system. For example, the MITU 700 may receive instructions from the central system to raise or reduce the specified temperature ranges based on the central system determining faulty temperature sensor readings. In other cases, the MITU 700 may be redirected to the closest storage facility or warehouse for a diagnosis check, offload its inventory to a functioning autonomous storage unit (if feasible), and/or evaluate the condition of its inventory. In this way, the corrective action may be implemented at the MITU 700 in a timely manner, which may also serve to minimize financial losses. In some embodiments, after offloading its inventory to the functioning autonomous storage unit, the MITU 700 may also provide it with instructions on completing the remainder of the mission.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for directing and controlling a robot in a control territory, the system comprising:
   the robot, and wherein the robot comprises:
      a housing,
      a power device, wherein the power device is operationally configured to supply power to the electrical components of the robot,
      a drive device, wherein the drive device is in electrical communication with the power device, and is operationally configured to physically move the robot in one or more control territories,
      a navigation device, wherein the navigation device is in electrical communication with the power device, and is operationally configured to transmit and receive geographic data and determine the physical location of the robot,
      a sensing device, wherein the sensing device is in electrical communication with the power device, and is operationally configured to detect physical objects and transmit and receive physical object data, and
      a control device, wherein the control device is in electrical communication with the power device, the drive device, the navigation device, and the sensing device, and is operationally configured to control the robot and transmit and receive data from physically separate systems;
   a transportation system comprising a transport controller, the transport controller operationally configured to transmit to and receive data from the robot and other secondary systems, and wherein the transportation system is operationally configured to physically receive the robot, and physically transport the robot between the one or more control territories;
   a first controller, wherein the first controller is assigned to a first control territory, and wherein the first controller is in communication with the control device of the robot, the transport controller, and a second controller;
   and wherein the system comprises:
      one or more hardware processors configured by machine-readable instructions to,
      negotiate, by the first controller, a dispatch routine for the robot with one or more of the transport controller and the second controller;
      assign, by the first controller, a first authentication token to the robot and the second controller, the first authentication token providing an identification signal between the robot and the second controller;
      assign, by the first controller, a second authentication token to the robot and the transport controller;
      provide a second secure connection between the robot and the transport controller, wherein the second secure connection is based at least in part on an authentication handshake between the robot and the transport controller, and wherein the authentication handshake comprises exchanging the second authentication token;
      register, by the robot, a departure event with the first controller;
      provide a first secure connection between the robot and the second controller;
      exchange the first authentication token between the robot and the second controller;
      authenticate the first secure connection between the robot and the second controller based at least in part on exchanging the first authentication token;
      give, by the second controller, the robot permission to access a second control territory at a delivery location, the second controller assigned to the second control territory.

2. The system of claim 1, wherein the dispatch routine is further negotiated with one or more of a client and a way station.

3. The system of claim 1, wherein the one or more hardware processors are further configured by machine-readable instructions to:
   provide, by the transport controller, a transport route to the robot, the transport route including information about permitted parking areas, drive paths and building access instructions; and
   send, by the transport controller, a signal to the robot when the transportation system arrives at the delivery location.

4. The system of claim 3, wherein the second controller conveys site data associated with the second control territory to the robot.

5. The system of claim 4, wherein the site date associated with the second control territory comprises one or more of: permitted drive paths, waiting areas, building access codes, and charging station locations in the second control territory.

6. The system of claim 1, wherein the one or more hardware processors are further configured by machine-readable instructions to:
  deposit, by the robot, a first inventory item at the delivery location;
  accept, by the robot, a second inventory item from the delivery location.

7. The system of claim 6, wherein the robot negotiates a second dispatch routine with one or more of the first controller, the second controller, and the transport controller.

8. The system of claim 1, wherein the one or more hardware processors are further configured by machine-readable instructions to:
  identify a hostage event for the robot in the second control territory, the hostage event comprising at least a physical blocking of the robot;
  transmit, by the robot, an alert to the first controller based in part on identifying the hostage event.

9. A method of directing and controlling a robot in a control territory, the method comprising:
  negotiating, by a first controller, a dispatch routine for the robot with one or more a transport controller and a second controller, wherein the first controller is assigned to a first control territory, and the second controller is assigned to a second control territory;
  assigning, by the first controller, a first authentication token to the robot and the second controller, the first authentication token providing an identification signal between the robot and the second controller;
  assigning, by the first controller, a second authentication token to the robot and the transport controller;
  providing a second secure connection between the robot and the transport controller, wherein the second secure connection is based at least in part on an authentication handshake between the robot and the transport controller, and wherein the authentication handshake comprises exchanging the second authentication token;
  registering a departure event with the first controller;
  providing a first secure connection between the robot and the second controller, wherein the first secure connection comprises a wireless network;
  exchanging, using the first secure connection, the first authentication token between the robot and the second controller;
  authenticating the first secure connection between the robot and the second controller based at least in part on exchanging the first authentication token;
  giving, by the second controller, the robot permission to access the second control territory at a delivery location; and
  accessing, by the robot, the second control territory, wherein the accessing comprises one or more of: physically moving to an entry point at the second control territory, physically entering the second control territory, and physically moving within the second control territory.

10. The method of claim 9, wherein the dispatch routine is further negotiated with one or more of a client, and a way station.

11. The method of claim 9, further comprising:
  providing, by the transport controller, a transport route to the robot, the transport route including information about permitted parking areas, driving paths and building access instructions; and
  sending, by the transport controller, a signal to the robot when the transportation system assigned to the transport controller arrives at the delivery location.

12. The method of claim 11, wherein the second controller conveys site data associated with the second control territory to the robot.

13. The method of claim 12, wherein the site data associated with the second control territory comprises one or more of: permitted drive paths, waiting areas, building access codes, and charging station locations in the second control territory, and wherein the robot accesses the second control territory based in part on the site data.

14. The method of claim 9, further comprising:
  depositing, by the robot, a first inventory item at the delivery location; and
  accepting, by the robot, a second inventory item from the delivery location.

15. The method of claim 14, wherein the robot negotiates a second dispatch routine with one or more of the first controller, the second controller, and the transport controller.

16. The method of claim 9, further comprising:
  identifying a hostage event for the robot in the second control territory, the hostage event comprising at least a physical blocking of the robot;
  transmitting, by the robot, an alert to the first controller based in part on identifying the hostage event.

17. A non-transient computer-readable storage medium having instructions embodied thereon, the instructions being executable by one or more processors to perform a method for directing and controlling a robot in a control territory, the method comprising:
  negotiating, by a first controller, a dispatch routine for the robot with one or more of a transport controller and a second controller, wherein the first controller is assigned to a first control territory, and the second controller is assigned to a second control territory;
  assigning, by the first controller, a first authentication token to the robot and the second controller, the first authentication token providing an identification signal between the robot and the second controller;
  assigning, by the first controller, a second authentication token to the robot and the transport controller;
  providing a second secure connection between the robot and the transport controller, wherein the second secure connection is based at least in part on an authentication handshake between the robot and the transport controller, and wherein the authentication handshake comprises exchanging the second authentication token;
  registering a departure event with the first controller;
  providing a first secure connection between the robot and the second controller, wherein the first secure connection comprises a wireless network;
  exchanging, using the first secure connection, the first authentication token between the robot and the second controller;
  authenticating the first secure connection between the robot and the second controller based at least in part on exchanging the authentication token;
  giving, by the second controller, the robot permission to access the second control territory at a delivery location; and
  accessing, by the robot, the second control territory, wherein the accessing comprises one or more of: physically moving to an entry point at the second control territory, physically entering the second control territory, and physically moving within the second control territory.

* * * * *